(12) United States Patent
Kim et al.

(10) Patent No.: US 9,160,417 B2
(45) Date of Patent: Oct. 13, 2015

(54) APPARATUS AND METHOD FOR DATA COMMUNICATION USING WIRELESS POWER

(75) Inventors: Nam Yun Kim, Seoul (KR); Sang Wook Kwon, Seongnam-si (KR); Yun Kwon Park, Dongducheon-si (KR); Young Tack Hong, Seongnam-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 390 days.

(21) Appl. No.: 13/482,133

(22) Filed: May 29, 2012

(65) Prior Publication Data
US 2012/0307873 A1    Dec. 6, 2012

(30) Foreign Application Priority Data
May 31, 2011    (KR) .................. 10-2011-0052179

(51) Int. Cl.
*H04L 27/22*    (2006.01)
*H04B 1/40*    (2015.01)
*H04B 5/00*    (2006.01)

(52) U.S. Cl.
CPC .................. *H04B 5/0031* (2013.01)

(58) Field of Classification Search
CPC ............ H04L 27/22; H04B 1/40; H02J 7/00; H02J 17/00
See application file for complete search history.

(56) References Cited

U.S. PATENT DOCUMENTS

| | | | |
|---|---|---|---|
| 2007/0182367 A1* | 8/2007 | Partovi | 320/108 |
| 2009/0284220 A1 | 11/2009 | Toncich et al. | |
| 2009/0286475 A1 | 11/2009 | Toncich et al. | |
| 2009/0286476 A1* | 11/2009 | Toncich et al. | 455/41.1 |
| 2010/0181961 A1 | 7/2010 | Novak et al. | |
| 2010/0217553 A1* | 8/2010 | Von Novak et al. | 702/65 |
| 2010/0248622 A1 | 9/2010 | Lyell Kirby et al. | |
| 2010/0277121 A1* | 11/2010 | Hall et al. | 320/108 |
| 2010/0308939 A1* | 12/2010 | Kurs | 333/219.2 |
| 2011/0050166 A1* | 3/2011 | Cook et al. | 320/108 |
| 2011/0057607 A1 | 3/2011 | Carobolante | |
| 2011/0062916 A1 | 3/2011 | Farahani | |
| 2011/0065398 A1* | 3/2011 | Liu et al. | 455/127.1 |
| 2011/0127848 A1* | 6/2011 | Ryu et al. | 307/104 |
| 2011/0217926 A1* | 9/2011 | Low et al. | 455/41.1 |
| 2011/0248572 A1* | 10/2011 | Kozakai et al. | 307/104 |
| 2012/0086283 A1* | 4/2012 | Yamamoto et al. | 307/104 |
| 2012/0223589 A1* | 9/2012 | Low et al. | 307/104 |

FOREIGN PATENT DOCUMENTS

| | | |
|---|---|---|
| JP | 10-014139 | 1/1998 |
| JP | 2007-336788 | 12/2007 |

* cited by examiner

*Primary Examiner* — Edward Urban
*Assistant Examiner* — Ralph H Justus
(74) *Attorney, Agent, or Firm* — NSIP Law

(57) ABSTRACT

According to one general aspect, a data communication apparatus using wireless power may include: a power signal detecting unit configured to detect a signal corresponding to a change in an impedance of a target device; a demodulating unit configured to demodulate a message from the target device from the detected signal using the detected signal and a carrier wave; and a source resonance unit configured to transmit the carrier wave to the target device.

27 Claims, 20 Drawing Sheets

APPARATUS AND METHOD FOR DATA COMMUNICATION USING WIRELESS POWER

CROSS-REFERENCE TO RELATED APPLICATION(S)

This application claims the benefit under 35 U.S.C. §119 (a) of Korean Patent Application No. 10-2011-0052179, filed on May 31, 2011, in the Korean Intellectual Property Office, the entire disclosure of which is incorporated herein by reference for all purposes.

BACKGROUND

1. Field

The following description relates to a data communication using wireless power.

2. Description of Related Art

As demand for portable electronic devices has rapidly increased, use of wired power supplies for these devices has become more inconvenient. Studies on wireless power transmission have been conducted to overcome inconveniences of wired power supplies and the limited capacity of conventional batteries.

One conventional wireless power transmission technology uses a resonance characteristic of a radio frequency (RF) device that may include a source that supplies power and a target that receives power. When a source device and a target device exchange information on a state of the source device and information on a state of the target device, the source device may effectively transmit power to the target device. Therefore, communication between the source device and the target device may be needed.

SUMMARY

According to one general aspect, a data communication apparatus using wireless power may include: a power signal detecting unit configured to detect a signal corresponding to a change in an impedance of a target device; a demodulating unit configured to demodulate a message from the target device from the detected signal using the detected signal and a carrier wave; and a source resonance unit configured to transmit the carrier wave to the target device.

The demodulating unit may mix the detected signal and a signal corresponding to the carrier wave of which the phase is shifted.

The apparatus may further include: a controller configured to control the phase of the carrier wave based on the size of the source resonator.

The apparatus may further include: a sensing unit configured to sense the change in the impedance of the target device based on a change in the magnitude of the detected signal.

The power signal detecting unit may include a coupling unit configured to detect the signal using a coupling resistor, a coupling inductor, or a coupling capacitor.

The coupling unit may perform coupling to detect the signal from a power line or a ground line that is connected between a power amplifier and the source resonator.

The carrier wave may use a resonance frequency of the source resonator as a carrier frequency.

The power signal detecting unit may include a power limiting unit configured to limit the magnitude of the detected signal.

The power limiting unit may limit the magnitude of the detected signal by a difference between a maximum value of the carrier wave and a maximum value of the output power signal generated based on the change in the impedance of the target device The power signal detecting unit may include a reception controller configured to control reception of the signal while the source resonator transmits a wake-up signal that awakens the target device.

The demodulating unit may include a phase mixing unit configured to generate a mixed signal by mixing the detected signal and a signal that is in phase with the carrier wave; and a comparing unit configured to compare the mixed signal and a reference signal.

The demodulating unit may demodulate the message from the target device based on a value output from the comparing unit.

The demodulating unit may include: a distributing unit configured to divide the detected signal into a first signal and a second signal; an in-phase mixing unit configured to generate a first mixed signal by mixing the first signal and a signal that is in phase with the carrier wave; and an out-of-phase mixing unit configured to generate a second mixed signal by mixing the second signal and a signal that is out of phase with the carrier wave.

The demodulating unit may further include a comparing unit configured to compare the first mixed signal and the second mixed signal.

The demodulating unit may further include: a first comparing unit configured to compare the first mixed signal and the first reference signal; and a second comparing unit configured to compare the second mixed signal and the second reference signal.

The demodulating unit may demodulate the message from the target device comparing the value output from the first comparing unit, or the value output from the second comparing unit, for one or more time periods.

According to another general aspect, a data communication apparatus using wireless power may include: a target resonance unit configured to receive a carrier wave from a source resonator; a modulating unit configured to modulate a message based on the carrier wave and an impedance mismatching between and a source device and a target device; and a controller configured to control the impedance mismatching by changing the impedance of the target device.

The controller may change the impedance and a phase of the target device.

The controller may control current flowing through a load.

The controller may change the impedance of the target device.

The controller may change the impedance and the phase of the target device.

The controller may change the impedance and the phase of the target device by switching a switch connected to a load of the target device.

According to a further general aspect, a data communication method using wireless power may include: detecting a signal corresponding to a change in an impedance of a target device; demodulating a message from the target device from the detected signal using the detected signal and a carrier wave; and transmitting the carrier wave to the target device.

The demodulating may include: mixing the detected signal and a signal corresponding to the carrier wave of which the phase is shifted.

The method may further include controlling the phase of the carrier wave based on the size of a source resonator.

The detecting may include performing coupling to detect the signal using a coupling resistor, a coupling inductor, or a coupling capacitor.

The detecting may include limiting the magnitude of the detected signal.

The magnitude of the detected signal may be limited by the difference between the maximum value of the carrier wave and the maximum value of the detected signal generated based on the change in the impedance of the target device.

The demodulating may include: generating a mixed signal by mixing the detected signal and a signal that is in phase with the carrier wave; comparing the mixed signal and a reference signal; and outputting a value based on the comparison.

The demodulating may include demodulating a message of the target device based on the outputted value.

According to yet another general aspect, a data communication method using wireless power may include: receiving a carrier wave from a source resonator; modulating a message based on the carrier wave and an impedance mismatching between a source device and a target device; and controlling the impedance mismatching by changing an impedance of the target device.

The controlling may include: controlling current flowing through a load of the target device.

The controlling may control current flowing through a load.

Other features and aspects may be apparent from the following detailed description, the drawings, and the claims.

Figure 1:
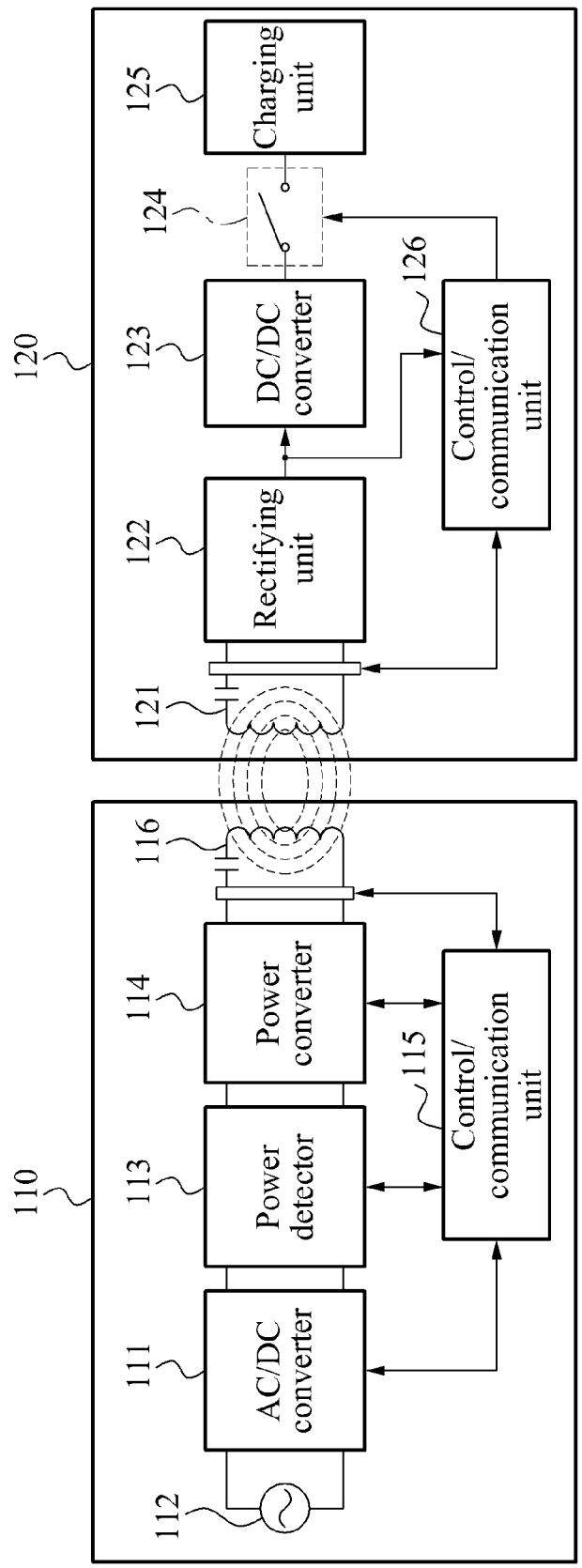
FIG. 1 is a diagram illustrating a wireless power transmission system.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein may be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of well-known functions and constructions may be omitted for increased clarity and conciseness.

FIG. 1 illustrates a wireless power transmission system.

As shown in FIG. 1, the wireless power transmission system includes a source device 110 and a target device 120. The source device 110 may correspond to a device supplying wireless power and may include various types of electric devices that supply power, such as, for example, pads, computers, terminals, televisions (TVs), and the like.

The target device 120 may correspond to a device receiving wireless power, and may include various types of electronic devices that consume power, such as, for example, terminals, TVs, vehicles, washing machines, radios, lights and the like.

The source device 110 may include an alternating current-to-direct current (AC/DC) converter 111, a power detector 113, a power converter 114, a control/communication unit 115, and a source resonator 116.

The target device 120 may include a target resonator 121, a rectifying unit 122, a DC-to-DC (DC/DC) converter 123, a switch unit 124, a charging unit 125, and a control/communication unit 126. The AC/DC converter 111 may receive AC voltage from a power supply 112 and output DC voltage of a predetermined level, and/or may adjust an output level of DC voltage based on the control of the control/communication unit 115.

The power detector 113 may detect an output current and an output voltage of the AC/DC converter 111, and may transfer, to the control/communication unit 115, information on the detected current and the detected voltage. The power detector 113 may detect an input current and an input voltage of the power converter 114.

The power converter 114 may convert DC voltage of a predetermined level to AC voltage, for example, using a switching pulse signal in a band of a few megahertz (MHz) to tens of MHz. The power converter 114 may convert DC voltage to AC voltage using a resonance frequency and thus, may generate communication power to be used for communication or charging power to be used for charging in the target device 120. The communication power to be used for communication may correspond to energy for activating a processor and a communication module of the target device 120. Further, the communication power to be used for communication may be referred to as a "wake-up power" in terms of the energy for activating a processor and a communication module of the target device 120. The communication power used for communication may be transmitted in a form of a constant wave during a predetermined time period, for instance. The charging power used for charging may correspond to energy for charging a battery connected to or included in the target device 120. Further, the charging power may be continuously transmitted during a predetermined time period, and may be transmitted at a power level greater than the communication power used for communication.

The control/communication unit 115 may control a frequency of a switching pulse signal. The frequency of the switching pulse signal may be determined based on the control of the control/communication unit 115. By controlling the power converter 114, the control/communication unit 115 may generate a modulated signal to be transmitted to the target device 120. The control/communication unit 115 may transmit various messages to the target device 120, for instance, through in-band communication. The control/communication unit 115 may detect a reflected wave, and may demodulate a signal received from the target device 120 through an envelope of the detected reflected wave.

The term "in-band" communication(s), as used herein, means communication(s) in which information (such as, for example, control information, data and/or metadata) is transmitted in the same frequency band, and/or on the same channel, as used for power transmission. According to one or more embodiments, the frequency may be a resonance frequency. And, the term "out-band" communication(s), as used herein, means communication(s) in which information (such as, for example, control information, data and/or metadata) is transmitted in a separate frequency band and/or using a separate or dedicated channel, than used for power transmission.

The control/communication unit 115 may generate a modulated signal for in-band communication, using various schemes. To generate the modulated signal, the control/communication unit 115 may turn a switching pulse signal ON and OFF, or may perform delta-sigma modulation. Additionally, the control/communication unit 115 may generate a pulse-width modulated (PWM) signal having a predetermined envelope.

The control/communication unit 115 may perform out-band communication using a communication channel, as opposed to using a resonance frequency. The control/communication unit 115 may include a communication module, such as one configured to process ZigBee, Bluetooth, Wi-Fi, Wi-Max, and the like communications. The control/communication unit 115 may perform transmission and reception of data with the target device 120, through out-band communication.

The source resonator 116 may transfer an electromagnetic energy to the target resonator 121. The source resonator 116 may transfer, to the target device 120, communication power to be used for communication and/or charging power to be used for charging through magnetic coupling with the target resonator 121.

The target resonator 121 may receive the electromagnetic energy from the source resonator 116. The target resonator 121 may receive, from the source device 110, the communication power to be used for communication or the charging power to be for charging through a magnetic coupling with the source resonator 116, for instance. The target resonator 121 may receive various messages from the source device 110 through in-band communication.

The rectifying unit 122 may generate DC voltage by rectifying AC voltage with the AC voltage being received by the target resonator 121.

The DC/DC converter 123 may adjust a level of the DC voltage output from the rectifying unit 122 based on a capacity of the charging unit 125. For example, the DC/DC converter 123 may adjust the level of the DC voltage output from the rectifying unit 122 from 3 Volts (V) to 10 V.

The switch unit 124 may be actuated (e.g., turned ON and OFF), based on the control of the control/communication unit 126. When the switch unit 124 is turned OFF, the control/communication 115 of the source device 110 may detect a reflected wave. When the switch unit 124 is turned OFF, the magnetic coupling between the source resonator 116 and the target resonator 121 may cease.

The charging unit 125 may include, or otherwise be electrically connected to, at least one battery. And the charging unit 125 may charge the at least one battery using DC voltage output from the DC/DC converter 123.

The control/communication unit 126 may perform in-band communication for transmitting and receiving data using a resonance frequency. For example, the control/communication unit 126 may demodulate a received signal by detecting a signal between the target resonator 121 and the rectifying unit 122, and/or by detecting an output signal of the rectifying unit 122. The control/communication unit 126 may demodulate a message received through the in-band communication.

The control/communication unit 126 may adjust an impedance of the target resonator 121 so as to modulate a signal to be transmitted to the source device 110. The control/communication unit 126 may modulate the signal to be transmitted to the source device 110, by turning the switch unit 124 ON and OFF. For example, the control/communication unit 126 may increase the impedance of the target resonator 121 so that a reflected wave may be detected from the control/communication unit 115 of the source device 110. And, depending on whether the reflected wave is detected, the control/communication unit 115 may detect a binary value (e.g., "0" or "1").

The control/communication unit 126 may perform out-band communication using a communication channel. The control/communication unit 126 may include a communication module, such as one configured to process Zigbee, Bluetooth, Wi-fi, Wi-max and the like communications. The control/communication 126 may perform transmission and reception of data with the source device 110.

Figure 2:
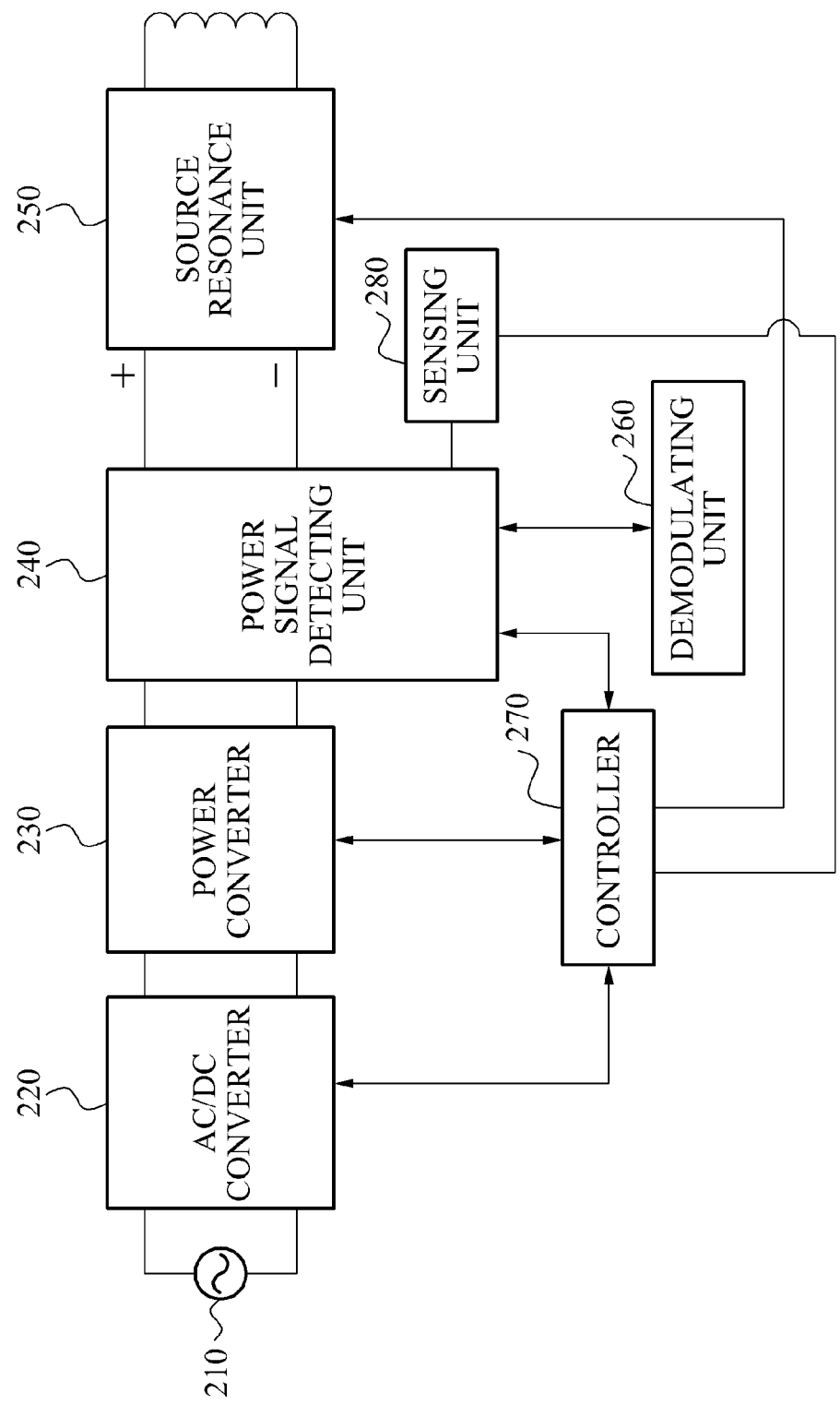
FIG. 2 is a block diagram illustrating a data communication apparatus using wireless power.

FIG. 2 illustrates a data communication apparatus using wireless power.

As shown in FIG. 2, the data communication apparatus includes a frequency generating unit 210, an AC/DC converter 220, a power converter 230, a power signal detecting unit 240, a source resonance unit 250, a demodulating unit 260, a controller 270 and a sensing unit 280.

The frequency generating unit 210 may be configured to generate a resonance frequency. The resonance frequency may be determined by the controller 270. The controller 270 may determine the resonance frequency and impedance matching between a source device and a target device. The AC/DC converter 220 may rectify an AC signal so as to convert the AC signal to a predetermined DC signal. The power converter 230 may amplify, using a power amplifier (PA), input power to a magnitude corresponding to a request of the target device. The PA may be operated by power supplied from a switching mode power supply (SMPS), for example. The SMPS may function as the AC/DC converter, in some instances, with the PA may generating the AC power signal based on a supply voltage of the SMPS.

The power signal detecting unit 240 may be configured to detect an output power signal output from the power converter 230. The power converter 230 may generate a wake-up power signal that operates the target device. For example, an AC signal generated from the power converter 230 may be used as a carrier wave that uses a resonance frequency between a source resonator and a target resonator as a carrier frequency.

When an impedance of the target device changes the power converter 230 may output a new output power signal corresponding to the change in the impedance. The controller 270 may perform impedance matching based on the change in the impedance of the target device, and may provide, to the power converter 230, information on a new output power to be output from the power converter 230.

The target device may generate impedance mismatching between the source device and the target device by changing the impedance. The target device may modulate a message using the impedance matching. The modulation of the message using the impedance matching may be referred to as load modulation.

The output power signal may include a signal to be transmitted from the source resonator to the target resonator using a resonance frequency, and a signal to be transmitted using a load modulation frequency that is based on the impedance mismatching of the target device. The load modulation frequency may correspond to a frequency that uses a resonance frequency as a carrier frequency and that is changed based on the impedance mismatching. The phase or the magnitude of the load modulation signal may vary based on the location of the target device on the source resonator. For instance, the phase of the load modulation signal may be out of phase with a phase of the resonance frequency.

The output power signal may be transferred to the source resonance unit 250, and the source resonance unit 250 may transmit the output power signal to the target device.

The power signal detecting unit 240 may be configured to perform coupling to detect an output power signal from a power line or a ground line that is connected between the power converter 230 and the source resonance unit 250. The output power signal may be an AC signal of the resonance frequency, and may be detected at one of an anode and a cathode through coupling.

The source resonance unit 250 may be configured to transmit power included in a resonance frequency, through a magnetic coupling between the source resonator and the target resonator. The source resonator 250 may transmit a carrier wave that uses a resonance frequency as a carrier frequency.

The source resonance unit 250 may receive a message modulated based on the load modulation.

The demodulating unit 260 may demodulate the message from the target device by mixing the output power signal detected by the power signal detecting unit 240 and a carrier wave of which a phase is shifted, the carrier wave using a resonance frequency as a carrier frequency.

The phase of the detected output power signal may change based on the environment around the target device and/or an impedance mismatching of the target device. When the message is out of phase with the phase of the carrier wave, the demodulating unit 260 may adjust for the phase of the detected output power so as to demodulate the message from the target device. For example, when the phase of the detected output power signal is out of phase with the carrier wave, the demodulating unit 260 may not mix the phase of the carrier wave to the detected output power signal. Operations of the demodulating unit 260 will be further described with reference to FIGS. 14 through 16, below.

The controller 270 may control the phase of the carrier wave based on the size of the source resonator. When the size of the source resonator is relatively large, a change in size of the message from the target device and a change in a phase of the message may occur based on a location of the target device with respect to the source resonator. Thus, when the demodulating is performed, the size of the signal may become small or a probability of error may increase due to the change in the phase of data.

The controller 270 may be configured to control the change in the phase of the carrier wave to be mixed to the detected output power signal, based on the size of the source resonator and the size of the target device. As a result, the controller 270 may more variably control the change in the phase of the carrier wave as the probability of the error in the phase is higher.

The controller 270 may generate a control signal that controls the AC/DC converter 220, the power converter 230, the power signal detecting unit 240, the source resonance unit 250, the demodulating unit 260, and the sensing unit 280.

The data communication apparatus may further include the sensing unit 280. The sensing unit 280 may be configured to sense a change in an impedance of the target device, for instance, based on a change in the magnitude of an output power signal, output from the power converter 230.

Figure 3:
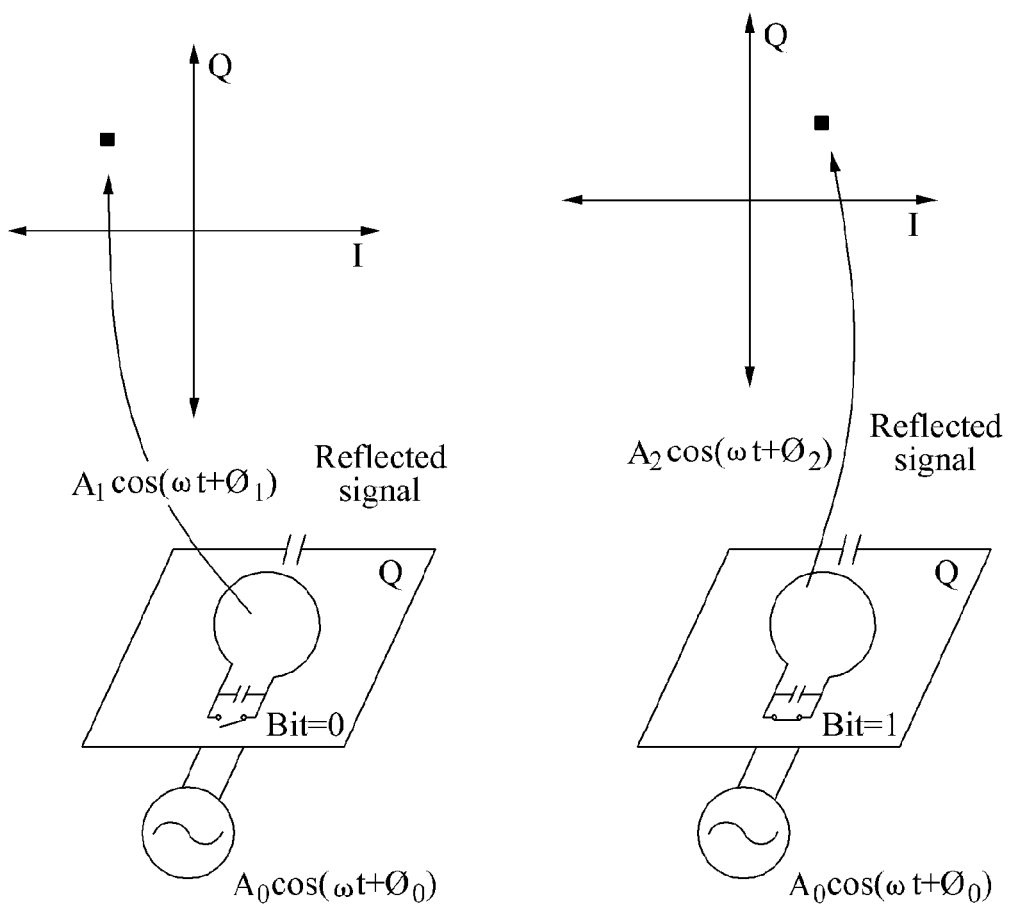
FIG. 3 is a diagram illustrating message transmission of a target device.

FIG. 3 illustrates message transmission of a target device.

The target device may modulate a message by actuating a switch connected to a target resonator between ON and OFF positions. Referring to FIG. 3, the target device may transmit the message by modulating the message as a bit "0" when the switch is turned OFF or modulating the message as a bit "1" when the switch is turned ON. Also, the target device may transmit the message by modulating the message as a bit "1" when the switch is turned OFF or modulating the message as a bit "0" when the switch is turned ON.

The target device may receive power carried by a resonance frequency from a source device. The power carried by the resonance frequency may be referred to as $A_0 \cos(\cos(\omega t+\phi_0))$. The target device may generate, using the resonance frequency as a carrier frequency, signals of different amplitudes and different phases based on ON and OFF states of the switch. In this example, the signals of different amplitudes and different phases may be referred to as reflected signals. The signal generated when the switch is turned OFF may be expressed as $A_1 \cos(\omega t+\phi_1)$, and a signal generated when the switch is turned ON may be expressed as $A_2 \cos(\omega t+\phi_2)$. As the switch is turned ON and OFF, amplitudes ($A_1$ and $A_2$) and phases ($\phi_1$ and $\phi_2$) of signals generated by the target device may change.

When $A_1 \cos(\omega t+\phi_1)$ or $A_2 \cos(\omega t+\phi_2)$ is generated by the target device based on ON and OFF states, the source device may output $A_0 \cos(\omega t+\phi_0)+A_1 \cos(\omega t+\phi_1)$ or $A_0 \cos(\omega t+\phi_0)+A_2 \cos(\omega t+\phi_2)$ based on a corresponding signal. The power signal detecting unit may detect $A_0 \cos(\omega t+\phi_0)+A_1 \cos(\omega t+\phi_1)$ or $A_0 \cos(\omega t+\phi_0)+A_2 \cos(\omega t+\phi_2)$, and a demodulating unit may demodulate $A_1 \cos(\omega t+\phi_1)$ or $A_2 \cos(\omega t+\phi_2)$.

The target device may generate, using a resonance frequency as a carrier frequency, signals of different amplitudes and different phases, based on impedance mismatching. Turning ON and OFF of the switch may be an example of the impedance mismatching.

Figure 4:
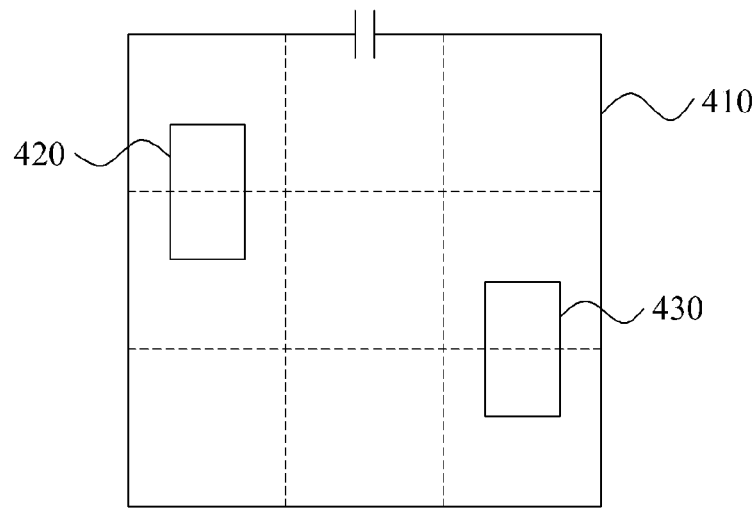
FIG. 4 is a diagram illustrating a target device located on a source device.

FIG. 4 illustrates a target device located on a source device.

As shown in FIG. 4, the target device located at a site 420 is away from a site 430 of a source resonator 410 of the source device. The source device may be configured as a pad-type resonator, as illustrated in FIG. 4. The source resonator 410 may be configured as a meta-resonator, a spiral resonator, helical resonator, and the like. The source resonator 410 may transmit wireless power to the target device.

The phase of the power signal received by the target device may vary for different locations of the target device. For instance, the phase of the power signal received by the target device at the site 420 and the phase of the power signal received by the target device at the site 430 may be different. When the target device transmits a message, a phase of the power signal received by the target device may vary based on the location of the target device and a phase of a reflected signal may vary due to impedance mismatching. The source device may adjust for the phase of the power signal that varies based on the location of the target device and thus, may demodulate the message transmitted from the target device without an error. The demodulating unit may change the phase of the resonance frequency signal and may mix the resonance frequency signal of which the phase is changed to an output power signal that varies based on the location of the target device so that an error in demodulating the message may be minimized and a receiving sensitivity may be improved.

Figure 5:
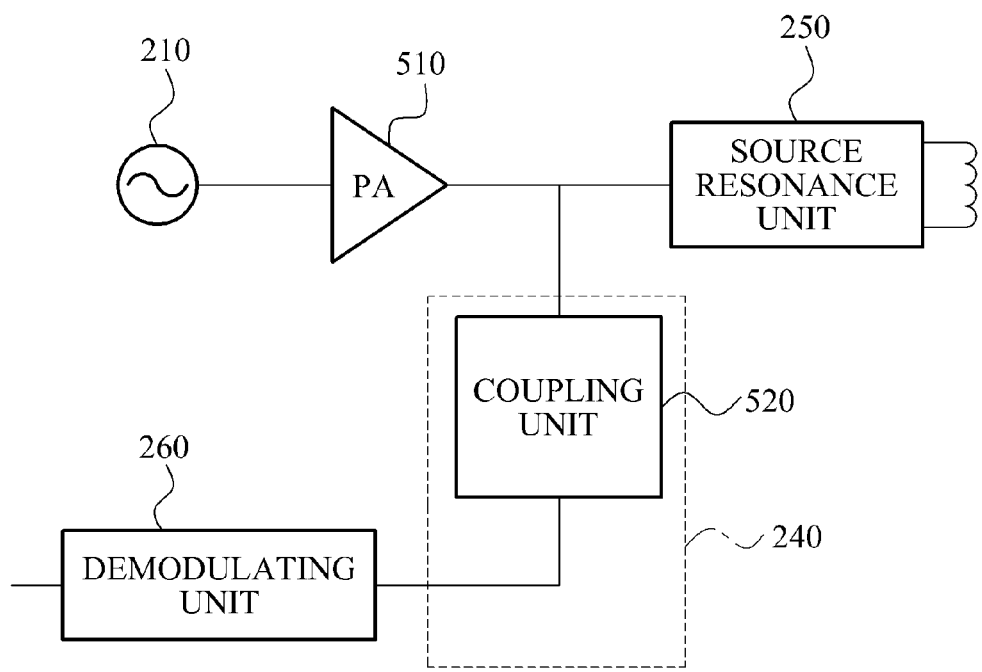
FIGS. 5 through 7 are diagrams illustrating various power signal detecting units.
Figure 6:
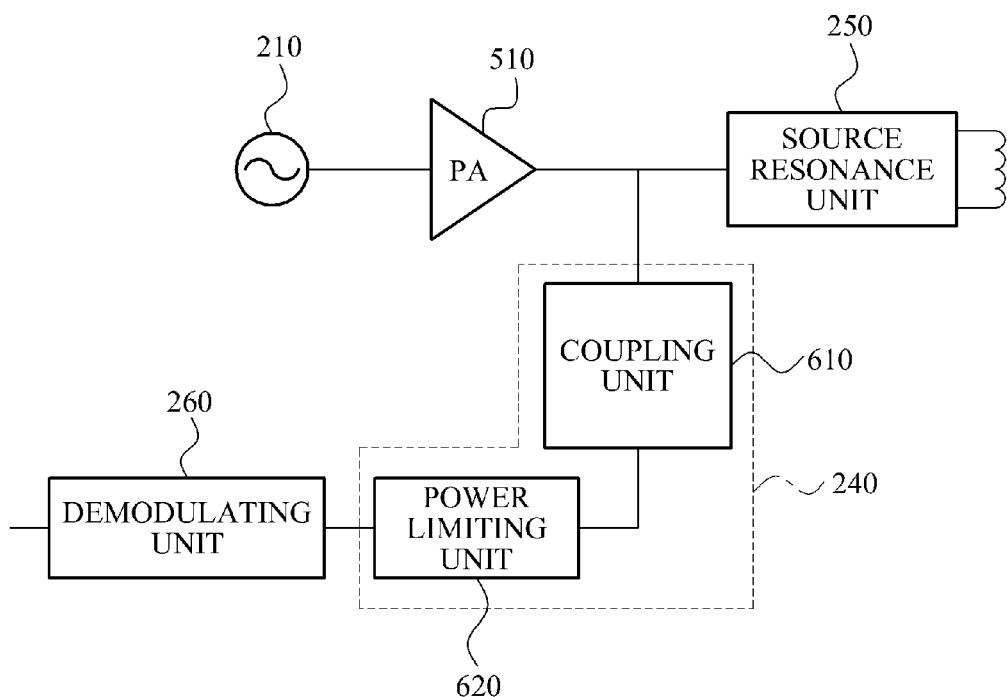
Figure 7:
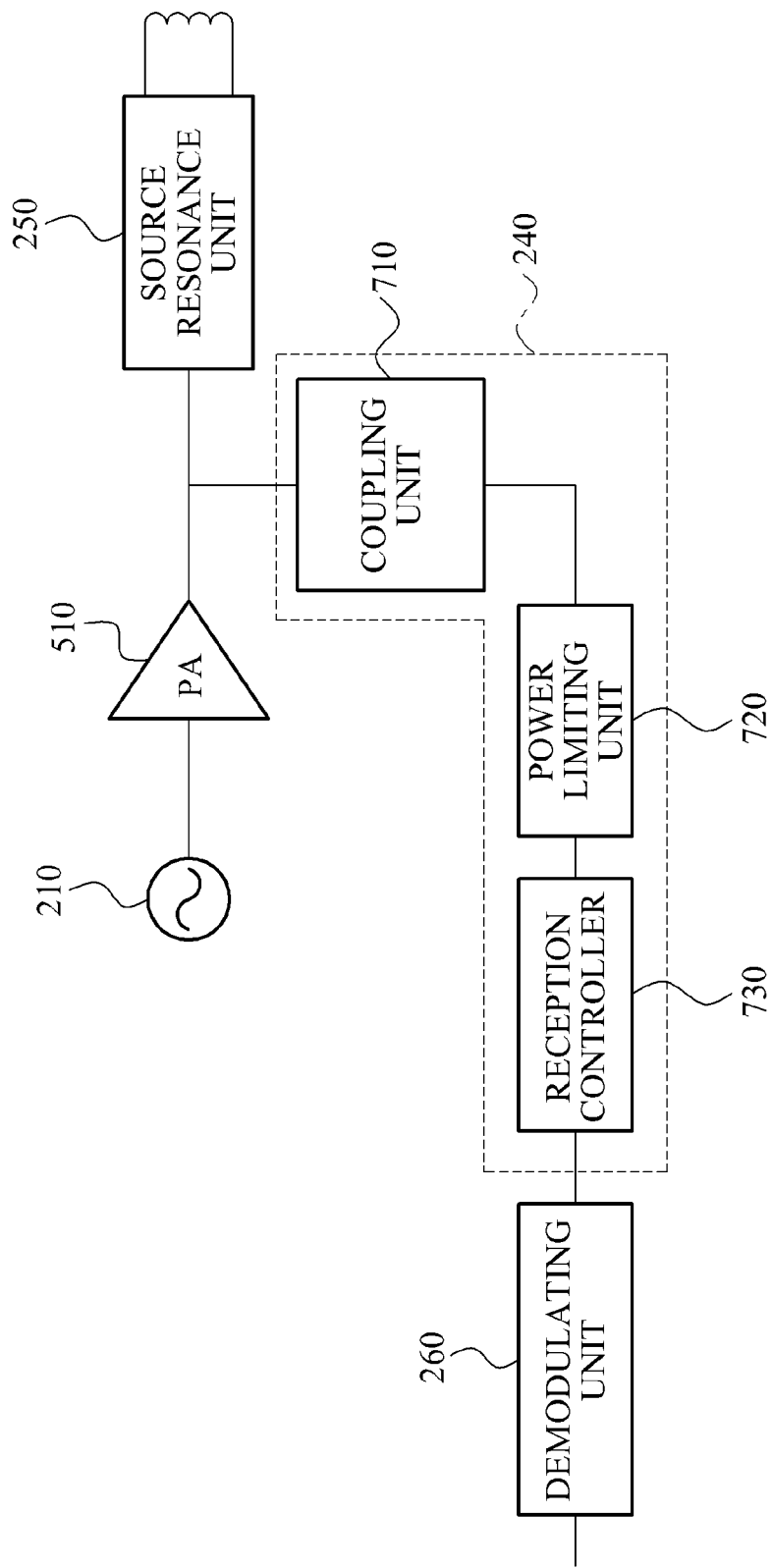

FIGS. 5 through 7 illustrate various embodiments of the power signal detecting unit 240 illustrated in FIG. 2.

As shown in FIG. 5, the power signal detecting unit 240 includes a coupling unit 520. The coupling unit 520 may be configured to perform coupling to detect an output power signal, using at least one of a coupling resistor, a coupling inductor, and a coupling capacitor. The magnitude of the detected signal may be determined based on the magnitude of the coupling resistance, the inductance of the coupling inductor, and/or the capacitance of the coupling capacitor. In some instances, the coupling may sample a predetermined amount of power output from a PA.

An output power signal may be output from a PA 510. The output power signal may include a message modulated based on load modulation of a target device. The coupling unit 520 may perform coupling to detect the output power signal from a power line, ground line, or both, which are connected between the PA 510 and the source resonator 250. The coupling unit 520 may perform coupling to detect the output power signal using the coupling resistor, the coupling inductor, the coupling capacitor, or any combination thereof.

Referring to FIG. 6, the power signal detecting unit 240 includes a coupling unit 610 and a power limiting unit 620. The coupling unit 610 may be configured to perform coupling to detect an output power signal. The power limiting unit 620 may be configured to limit the magnitude of the output power signal, for instance, by a predetermined magnitude. The output power signal may include a carrier wave and a load modulation signal. The carrier wave may be a signal that uses a resonance frequency as a carrier frequency, and the load modulation signal may be a signal of which the frequency or the phase is changed based on a change in an impedance of the target device. The target device may modulate a message using the load modulation signal.

The power limiting unit 620 may limit a magnitude of the output power signal by the value of the difference between the maximum value of the magnitude of the carrier wave and the maximum value of the magnitude of the load modulation signal. Limiting of the magnitude of the output power signal may denote clipping of the output power signal. The source device may demodulate the modulated message of the target device, and may limit a portion of power, e.g., the portion being recognized as the carrier wave, since the carrier wave may not be relevant to the modulated message.

As shown in FIG. 7, the power signal detecting unit 240 includes a coupling unit 710, a power limiting unit 720, and a reception controller 730. The power signal detecting unit 240 includes only the coupling unit 710 and the reception controller 730.

The coupling unit 710 may be configured to perform coupling to detect an output power signal. The power limiting unit 720 may be configured to limit the magnitude of the output power signal. For example, the power limiting unit 720 may limit the magnitude of the output power signal by a predetermined magnitude. In addition, the power limiting unit 720 may limit the magnitude of the output power signal by a value of the difference between the maximum value of the magnitude of the carrier wave and the maximum value of the magnitude of the load modulation signal.

The reception controller 730 may be configured to control reception of the output power signal in the demodulating unit 260. For example, when a message is not received from the target device while the source resonator transmits a wake-up signal, the source resonator may not demodulate the output signal. When the target device does not transmit a message according to a rule preset between the source device and the target device, the output power signal may not need to be transferred to the demodulating unit 260. The reception controller 730 may control a switch connected between the demodulating unit 260 and the power limiting unit 720 so as to transfer the output power signal to the demodulating unit 260 during a predetermined time period. Also, the reception controller 730 may control a switch connected between the demodulating unit 260 and the coupling unit 710. The reception controller 730 may control ON and OFF states of the switch so as to turn the switch ON while a message from the target device is received and so as to turn the switch OFF while a message from the target device is not received. The timing for transmitting a message of the source device and the timing for transmitting a message of the target device may be determined between the source device and the target device.

Figure 8:
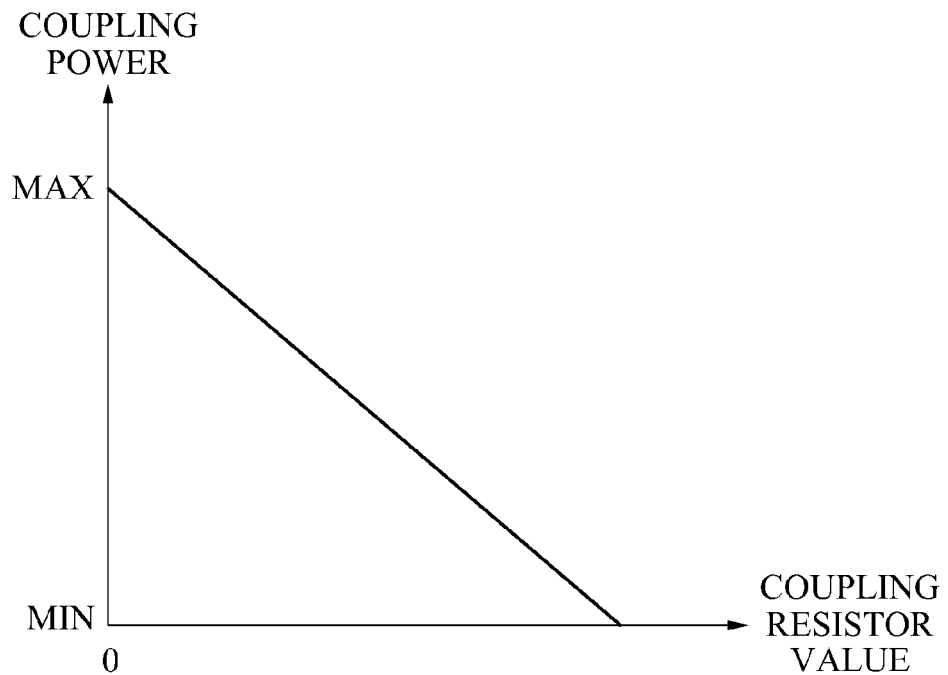
FIG. 8 is a graph illustrating coupling power as a function of coupling resistance of a coupling unit.

FIG. 8 illustrates a graph of coupling power as a function of the coupling resistance of a coupling unit.

The coupling unit may be configured to perform coupling to detect an output power signal using a coupling resistor. The coupling may be performed based on a signal coupling scheme generally used in a resonance frequency (RF) field. As shown in the graph of FIG. 8, as the coupling resistor value increases, the magnitude of the detected output power signal decreases. For instance, the coupling resistor value and the magnitude of the output power signal may be inversely proportional to each other. The coupling unit may determine the coupling resistor value so as to detect, through coupling, an output power signal of an appropriate magnitude.

Figure 9:
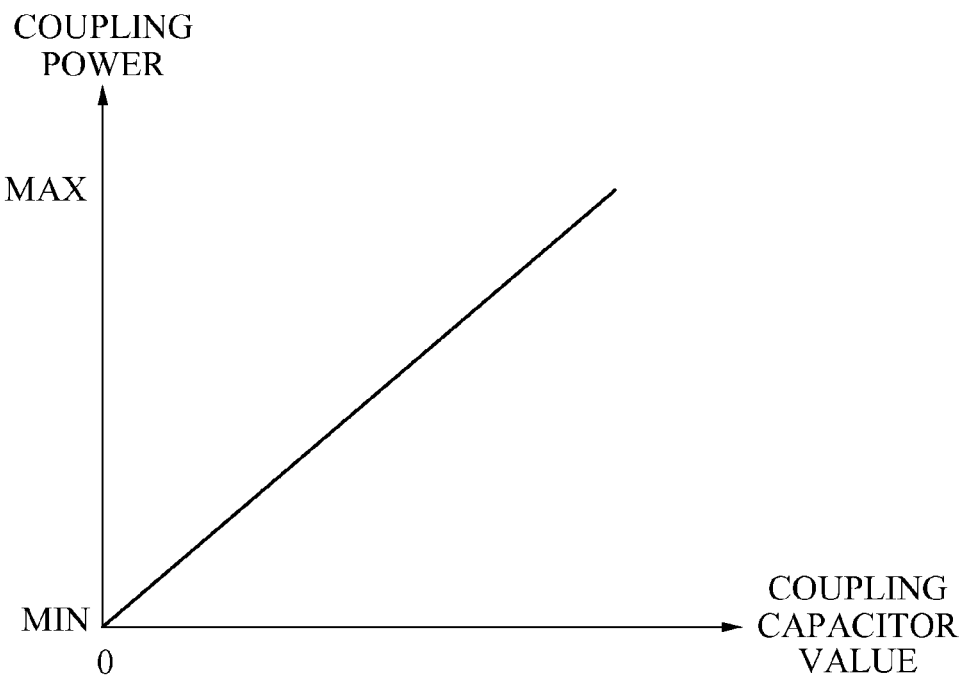
FIG. 9 is a graph illustrating coupling power as a function of coupling capacitance of a coupling unit.

FIG. 9 illustrates a graph of coupling power as a function of coupling capacitor.

The coupling unit may be configured to perform coupling to detect an output power signal using a coupling capacitor. The coupling may be performed based on a signal coupling scheme generally performed in an RF field. As shown in the graph of FIG. 9, as the value of a coupling capacitor increases a magnitude of the detected output power signal increases. The value of the coupling capacitor and the magnitude of the output power signal are proportional to each other. For instance, the value of the coupling capacitor may denote a capacitance of the coupling capacitor. The coupling unit may determine the value of the coupling capacitor so as detect, through coupling, an output power signal of an appropriate magnitude.

Figure 10:
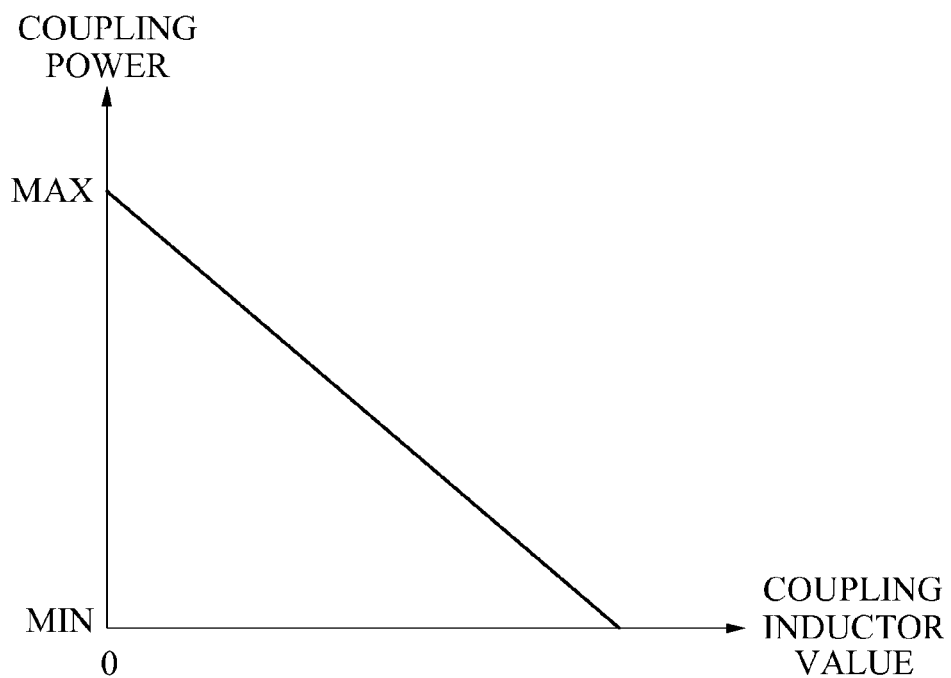
FIG. 10 is a graph illustrating coupling power as a function of coupling inductance of a coupling unit.

FIG. 10 illustrates a graph of coupling power as a function of the coupling inductor.

The coupling unit may be configured to perform coupling to detect an output power signal using a coupling inductor. The coupling may be performed based on a signal coupling scheme generally used in an RF field. As shown in the graph of FIG. 8, as the coupling inductor value increases the magnitude of the detected output power signal decreases. The coupling inductor value and the magnitude of the output power signal are inversely proportional to each other. For instance, the coupling inductor value may denote an inductance of the coupling inductor. The coupling unit may determine the coupling inductor value so as to detect, through coupling, an output power signal of an appropriate magnitude.

Figure 11:
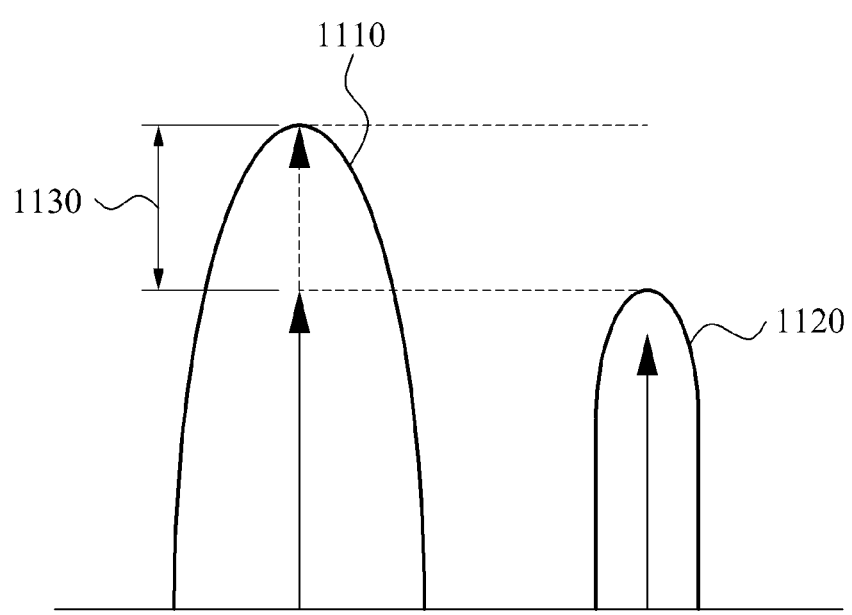
FIG. 11 is a diagram illustrating an operation of a power limiting unit.

FIG. 11 illustrates an operation of a power limiting unit.

The power limiting unit may be configured to limit the magnitude of an output power signal, for instance. The output power signal may include a carrier wave 1110 and a load modulation signal 1120. The carrier wave 1110 may be a signal that uses a resonance frequency as a carrier frequency and the load modulation signal 1120 may be a signal of which a frequency or a phase is changed based on a change in an impedance of the target device.

The power limiting unit may limit the magnitude of the output power signal by the difference 1130 between the magnitude of the carrier wave 1110 and the magnitude of the load modulation signal. The power limiting unit may limit the magnitude of the output power signal using a power limiter, a clipper circuit, and the like. The power limiting unit may limit the magnitude of the output power signal by a predetermined magnitude, as desired.

Figure 12:
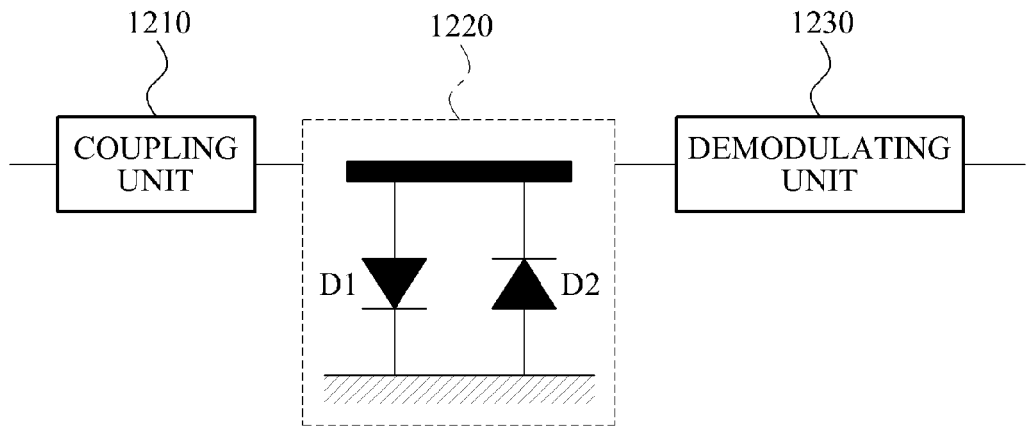
FIG. 12 is a diagram illustrating a power limiting unit.

FIG. 12 illustrates a power limiting unit 1220.

The power limiting unit 1220 may be configured to receive, as an input signal, an output power signal detected through coupling by a coupling unit 1210. The power limiting unit 1220 may limit the magnitude of the output power signal using at least one diode, for example, D1 and D2. In one embodiment, diodes D1 and D2 may be configured as a clipper circuit which is configured to prevent the output of a circuit from exceeding a predetermined voltage level without distorting the remaining part of the waveform. The power limiting unit 1220 may output an output power signal of which a magnitude is limited. A demodulating unit 1230 may be configured to demodulate the output power signal of which the magnitude is limited, after adjusting for a phase of the output power signal.

Figure 13:
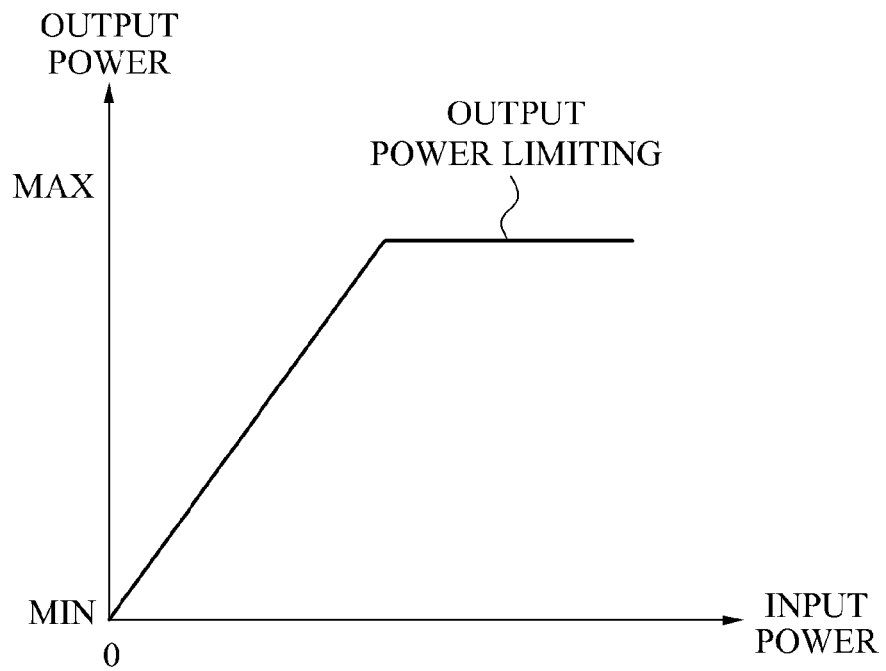
FIG. 13 is a graph illustrating output power as a function of input power of the power limiting unit of FIG. 12.

FIG. 13 illustrates a graph of output power as a function of input power of the power limiting unit of FIG. 12.

An output power signal input to the power limiting unit 1220 may be limited to a predetermined value in a section in which a magnitude of the output power signal is greater than a predetermined value. The power limiting unit 1220 may be configured to limit the output power signal to a predetermined value when the output power signal is greater than the maximum value of the magnitude of the load modulation signal.

Figure 14:
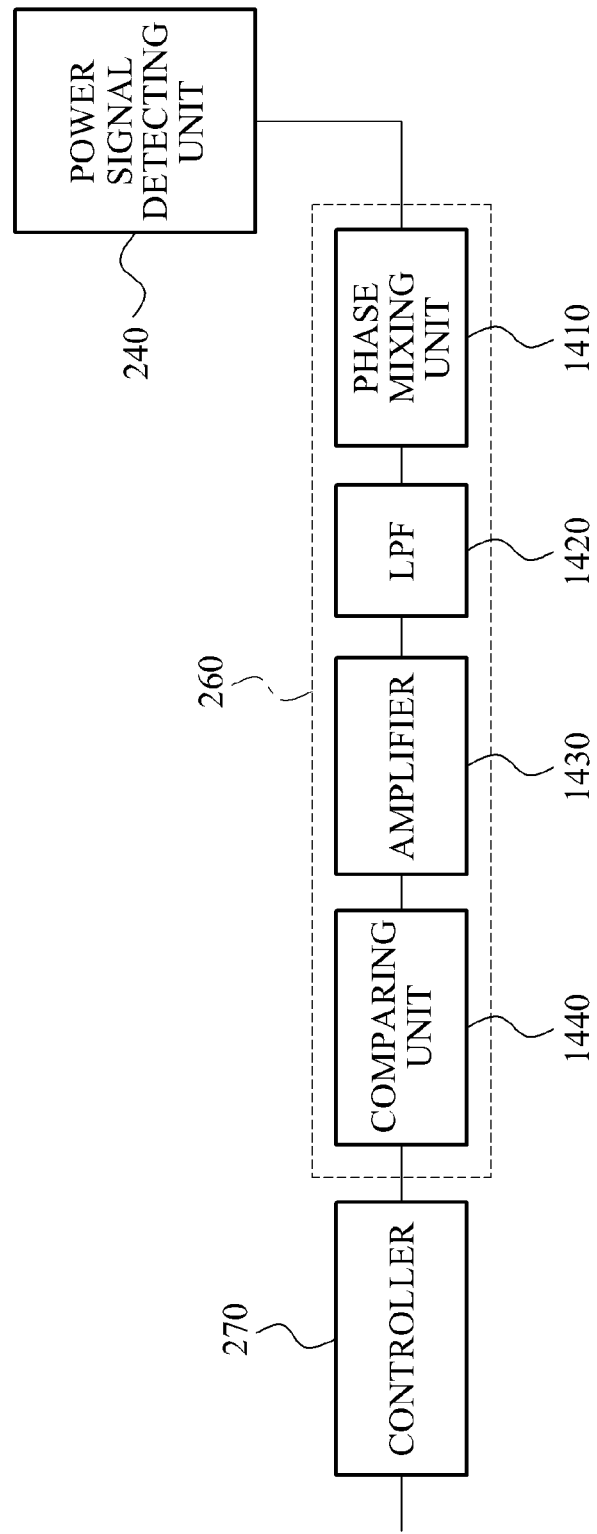
FIGS. 14 through 16 are diagrams illustrating various embodiments of demodulating units.
Figure 15:
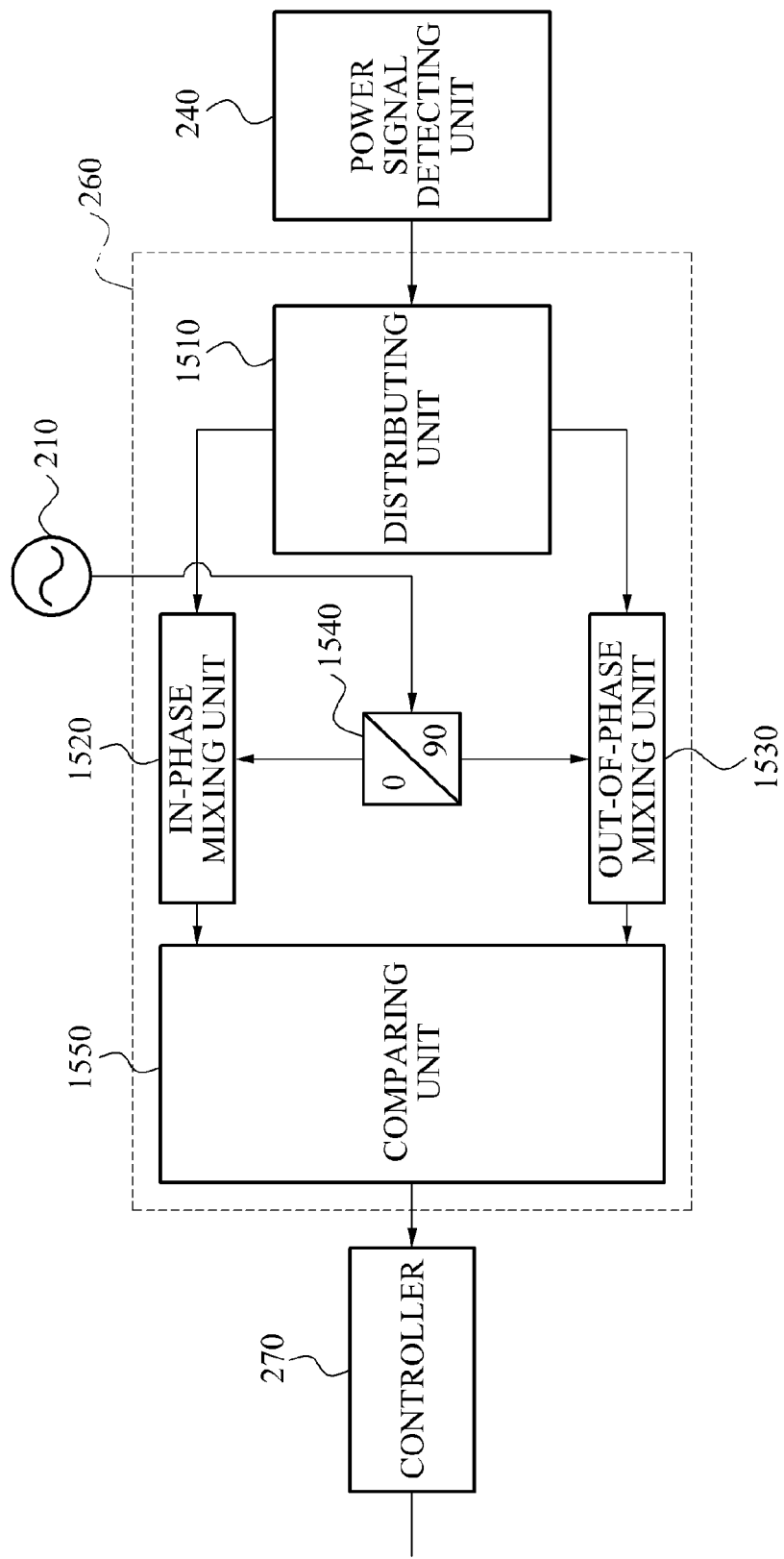
Figure 16:
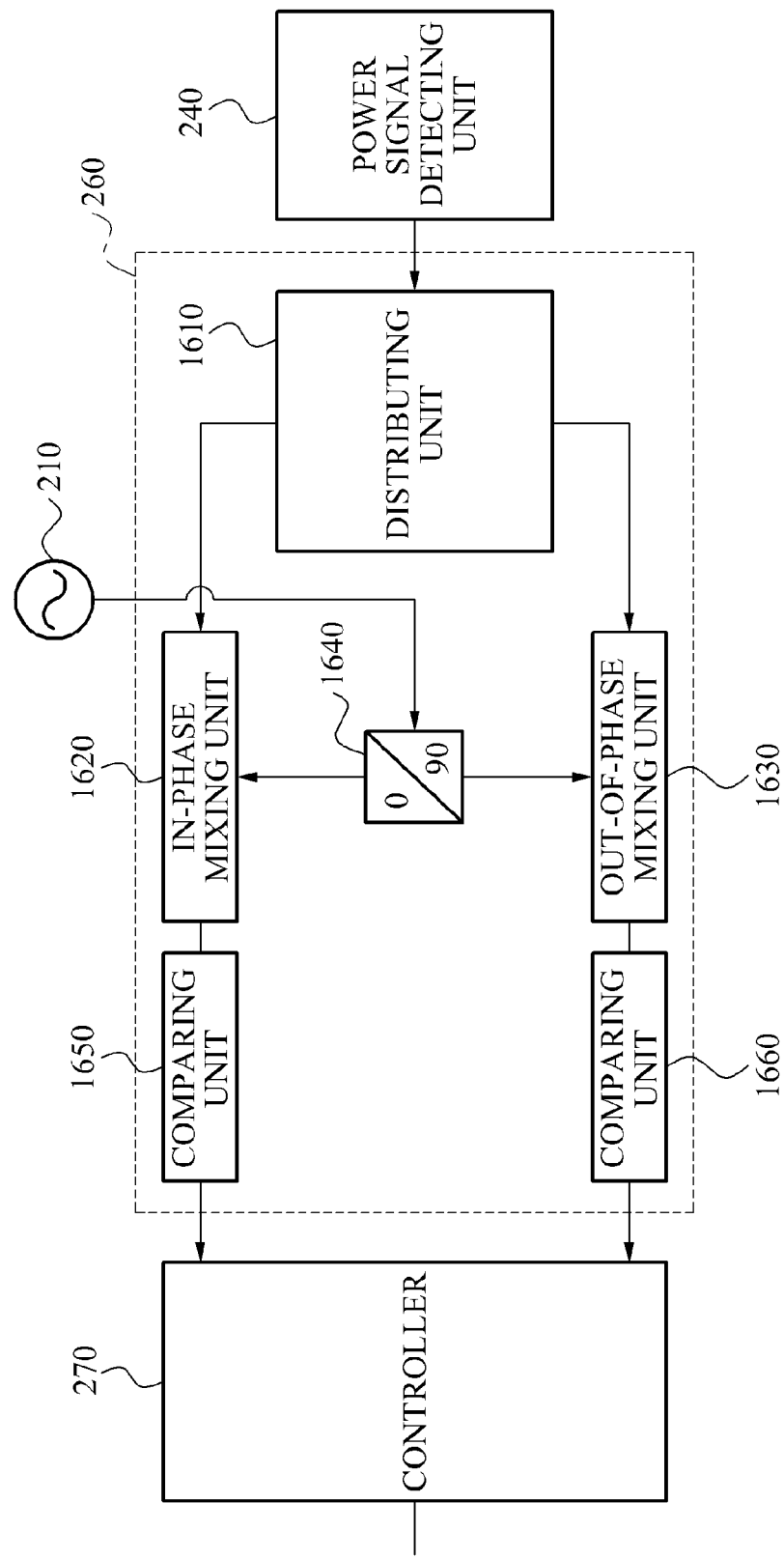

FIGS. 14 through 16 illustrate various demodulating units.

Referring to FIG. 14, the demodulating unit 260 includes a phase mixing unit 1410, a low pass filter (LPF) 1420, and amplifier 1430, and a comparing unit 1440.

The phase mixing unit 1410 may be configured to mix an output power signal detected by the power signal detecting unit 240 and a signal that is in phase with a carrier wave. The carrier wave may be a signal that uses a resonance frequency between a source resonator and a target resonator as a carrier frequency. The signal that is in phase with the carrier wave may be a sinusoidal signal. The phase mixing unit 1410 may output a portion that is in phase with the carrier wave in the mixed signal to be large, and may output a portion that is out of phase with the carrier wave in the mixed signal to be small. The phase mixing unit 1410 may mix the detected output power signal and a signal that is out of phase with the carrier wave by a predetermined phase. The signal that is out of phase with the carrier wave may be so by a predetermined phase, for example, 45 degrees, 90 degrees, and 180 degrees. In addition, the signal that is in phase with the carrier wave may be mixed with the detected output power signal. The phase mixing unit 1410 may mix the detected output power signal and the signal that is out of phase with the carrier wave by a predetermined phase in a range of a zero degree through 360 degrees.

The LPF 1420 may perform filtering of noise or a signal band having a low harmonic component from the mixed signal. The amplifier 1420 may amplify the filtered signal to a predetermined magnitude. The comparing unit 1440 may compare the mixed signal and a reference signal so as to output a "High" value or a "Low" value. For example, the reference signal may be the mixed signal when the magnitude of the mixed signal is minimal. The reference signal may be provided by the controller 270 and may be different for one or more mixed signals.

The demodulating unit 260 may be configured to demodulate a message from a target device, for example, based on the "High" value or the "Low" value output from the comparing unit. The controller 270 may also demodulate the message from the target device, for example, based on the "High" value or the "Low" value output from the comparing unit 1440.

As shown in FIG. 15, the demodulating unit 260 includes a distributing unit 1510, an in-phase mixing unit 1520, an out-of-phase mixing unit 1530, a phase shifting unit 1540, and a comparing unit 1550.

The distributing unit 1510 may be configured to divide a detected output power signal into a first signal and a second signal. For example, the first signal and the second signal having the same phase with the detected output power signal, may have different magnitudes.

The in-phase mixing unit 1520 may be configured to generate a first mixed signal by mixing the first signal and a signal that is in phase with a carrier wave generated from the frequency generating unit 210. The signal that is in phase with the carrier wave may correspond to a signal corresponding to the carrier wave of which the phase is shifted by the phase shifting unit 1540 by a zero degree, for instance.

The out-of-phase mixing unit 1530 may generate a second mixed signal by mixing the second signal and a signal that is out of phase with the carrier wave generated from the frequency generating unit 210. For example, the signal that is out of phase with the carrier wave may be a signal corresponding to the carrier wave of which the phase is shifted by the phase shifting unit 1540 by 90 degrees. When the carrier wave is a sine wave and the phase of the carrier wave is shifted by 90 degrees, the carrier wave may become a cosine wave.

Since the first signal and the second signal are in the same phase, the first signal and the second signal may be output as a mixed signal from at least one of the in-phase mixing unit 1520 or an out-of-phase mixing unit 1530. The frequency and the phase of the mixed signal may be synchronized with the carrier wave and thus, the demodulating unit 260 may demodulate the mixed signal so as to demodulate a message from a target device. Phases of the first signal and the second signal may be adjusted for by the in-phase mixing unit 1520 and the out-of-phase mixing unit 1530 and thus, may become in phase with the carrier wave.

The comparing unit 1550 may be configured to compare the magnitude of the first mixed signal and the magnitude of the second mixed signal so as to output a "High" value or "Low" value. The demodulating unit 260 and/or the controller 270 may demodulate the message from the target device, based on the "High" value or "Low" value.

The controller 270 may be configured to directly demodulate the message from the target device, by comparing the magnitude of the first mixed signal and the magnitude of the second mixed signal.

As shown in FIG. 16, the demodulating unit 260 includes a distributing unit 1610, an in-phase mixing unit 1620, an out-of-phase mixing unit 1630, a phase shifting unit 1640, a comparing unit 1650, and a comparing unit 1660. The comparing unit 1650 may compare a mixed signal of the in-phase mixing unit 1620 and a reference signal, and the comparing unit 1660 may compare a mixed signal of the out-of-phase mixing unit 1630 and the reference signal.

The distributing unit 1610 may be configured to divide a detected output power signal into a first signal and a second signal. In some instances, the first signal and the second signal have the same phase and the same magnitude.

The in-phase mixing unit 1620 may be configured to mix the first signal and a signal that is in phase with a carrier wave generated by the frequency generating unit 210 so as to generate a first mixed signal. The signal that is in phase with the carrier wave may be a signal corresponding to the carrier wave of which the phase is shifted by the phase shifting unit 1640 by a zero degree.

The out-of-phase mixing unit 1630 may be configured to mix the second signal and a signal that is out of phase with the carrier wave generated by the frequency generating unit 210 so as to generate a second mixed signal. The signal that is out of phase with the carrier wave may be a signal corresponding to the carrier wave of which the phase is shifted by the phase shifting unit 1640 by 90 degrees. For example, when the carrier wave is a sine wave and is shifted by 90 degrees, the carrier wave may become a cosine wave.

The comparing unit 1650 may be configured to compare the first mixed signal and the reference signal so as to output a "High" value or a "Low" value. For example, the reference signal may the first mixed signal when a magnitude of the first mixed signal is minimal. The reference signal may be provided by the controller 270 and may be different for each mixed signal, for example, the first mixed signal and the second mixed-signal.

The comparing unit 1660 may be configured to compare the second mixed signal and the reference signal so as to output a "High" value or a "Low" value. The reference signal may be the second mixed signal when a magnitude of the second mixed signal is small. The reference signal may be provided by the controller 270, and may be different for each mixed signal, for example, the first mixed signal and the second mixed-signal.

The demodulating unit 260 may demodulate a message from a target device, by comparing the "High" value or the "Low" value output from the comparing unit 1650 and the "High" value or the "Low" value output from the comparing unit 1660, for one or more synchronized times. The controller 270 may demodulate the message from the target device, by comparing the "High" value or the "Low" value output from the comparing unit 1650 and the "High" value or the "Low" value output from the comparing unit 1660, for one or more clock cycles of a processor.

Figure 17:
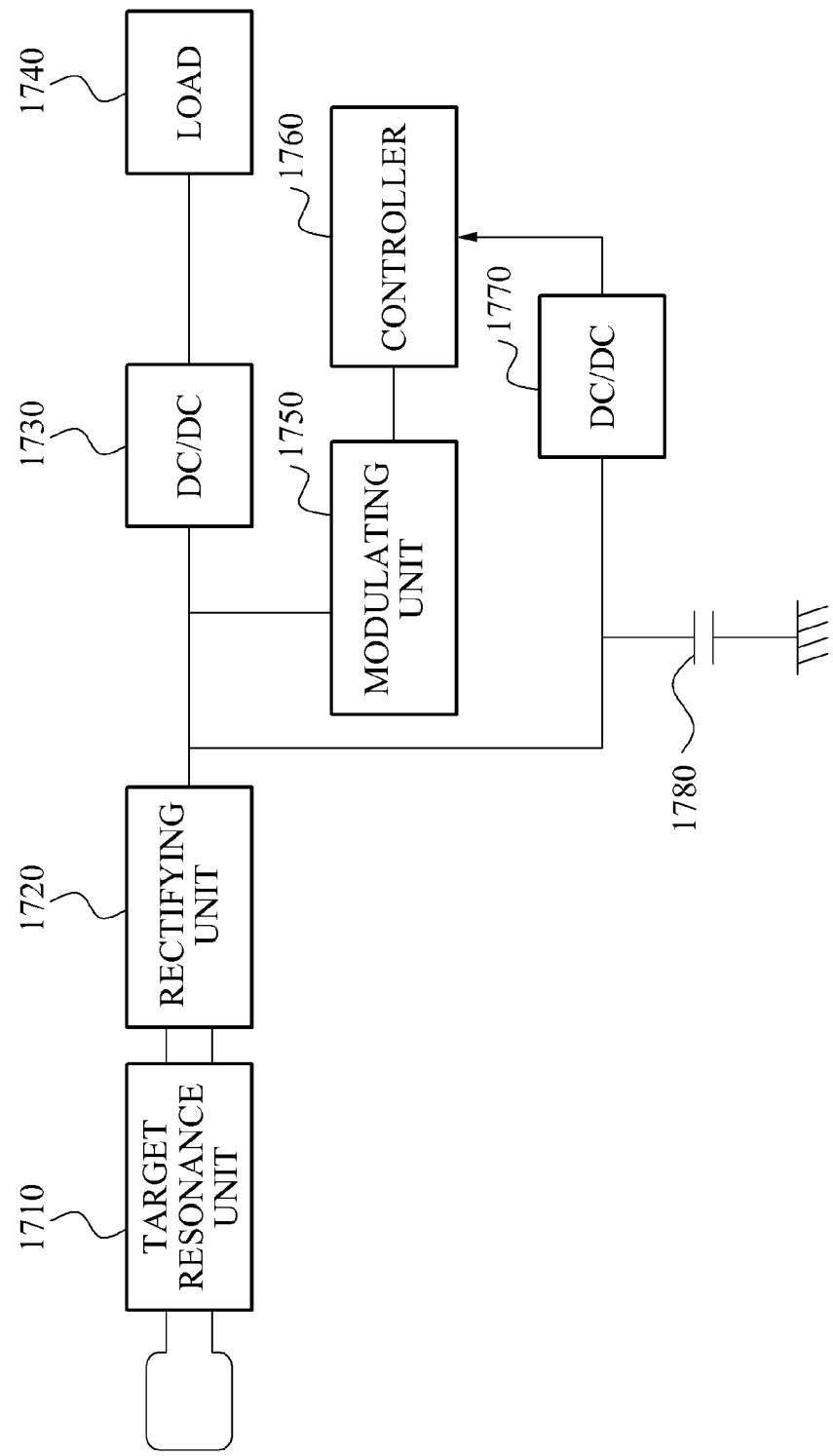
FIG. 17 is a block diagram illustrating a data communication apparatus using wireless power.

FIG. 17 illustrates a data communication apparatus using wireless power.

As shown in FIG. 17, the data communication apparatus includes a target resonance unit 1710, a rectifying unit 1720, DC/DC converters 1730 and 1770, a load 1740, a modulating unit 1750, and a controller 1760.

The target resonance unit 1710 may be configured to receive a carrier wave from a source resonator, for example, through a magnetic coupling between the source resonator and a target resonator. The carrier wave may be a signal that carries power using a resonance frequency as a carrier wave. The target resonance unit 1710 may receive a wake-up power that is used for operating the controller 1760 of the target device. The rectifying unit 1720 may be configured to rectify an AC signal to a DC signal. The carrier wave may be an AC signal and thus, the rectifying unit 1720 may rectify the carrier wave to the DC signal. The DC/DC converter 1730 may be configured to convert a DC signal to a voltage level or a current level requested by the load 1740.

The modulating unit 1750 may be configured to modulate a message based on the carrier wave and impedance mismatching between a source device and a target device. When the impedance mismatching occurs, a reflected power of the target device may increase. Therefore, by adjusting the impedance mismatching, the reflected power of the target device may be changed and the message may be modulated. The modulation of the message may be referred to as load modulation. Data mapped to the impedance mismatching may be provided by the controller 1760.

The controller 1760 may be configured to change an impedance of the target device. Therefore, the controller 1760 may control the impedance mismatching between the source device and the target device.

The controller 1760 may change the impedance of the target device by controlling ON and OFF states of a current flowing through a variable load or an active load and an amount of the current. When the variable load or the active load is connected to the target device and the current flows through the variable load or the active load, the impedance of the target device may be changed. The controller 1760 may change the magnitude of the variable load or may control the amount of current flowing through the variable load.

The controller 1760 may change the impedance of the target device, through a current source operating as the variable load. The controller 1760 may change the impedance of the target device by controlling the amount of the current flowing through the current source.

The controller 1760 may change the impedance of the target device, through ON and OFF states of a switch connected to the load 1740 of the target device. The controller 1760 may change the impedance of the target device, based on a connection between the load 1740 and the DC/DC converter 1730.

The DC/DC converter 1770 may convert a DC signal to a voltage level or a current level to be used for operation of the controller 1760. In some instances, reserve power may be stored in a capacitor 1780 to prevent the controller 1760 from stopping the operation.

Figure 18:
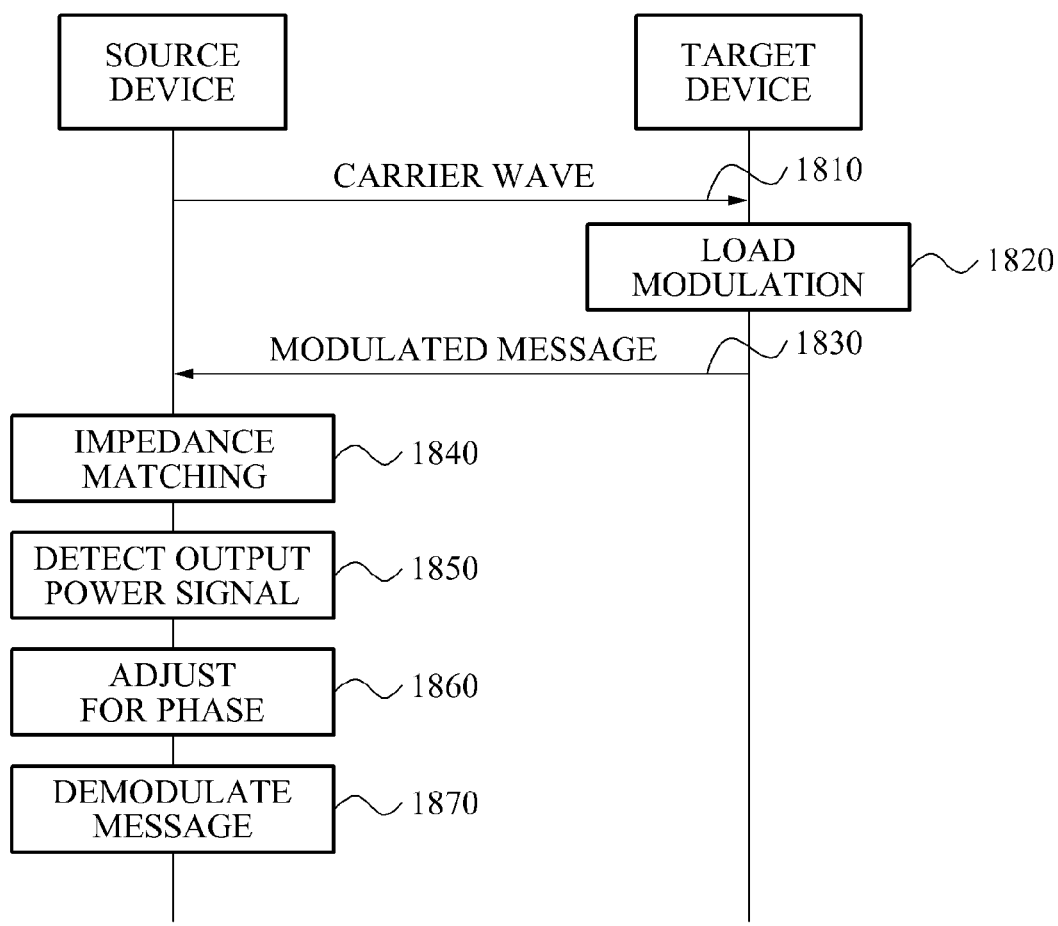
FIG. 18 is a flowchart illustrating a data communication method using wireless power.

FIG. 18 illustrates a data communication method using wireless power.

In operation 1810, a source device may transmit a carrier wave using a resonance frequency between a source resonator and a target resonator as a carrier frequency. The carrier wave may be transferred, e.g., in a form of a power signal, to a target device. The carrier wave may be transferred to the target device, through a magnetic coupling between the source resonator and the target resonator.

In operation 1820, the target device may change an impedance so as to generate impedance mismatching between the source device and the target device. The target device may modulate a message using the impedance mismatching, which is referred to as load modulation. For example, the target device may modulate the message using a reference frequency as a carrier frequency. The phase or the frequency of a load modulation signal may be changed based on an impedance mismatching and/or a location relationship between the source device and the target device.

In operation 1830, the source device may receive the message modulated by the load modulation. The reception of the modulated message may be sensed based on a change in a magnitude of an output power signal output from the source device. When the impedance of the target device changes, the magnitude of the output power signal output from the source device may also change.

In operation 1840, the source device may perform impedance matching for the changed impedance of the target device.

In operation 1850, the source device may detect the output power signal output during the impedance matching so as to detect the load modulation signal and the carrier wave. The source device may detect, through the coupling, an AC signal of the resonance frequency and thus, may detect the output power signal.

The source device may limit a magnitude of the coupled output power signal. The source device may limit the magnitude of the output power signal by a difference between a magnitude of the carrier wave and a magnitude of the load modulation signal. And the source device may decide not to detect the output power signal during a predetermined time period or may not demodulate the detected output power signal during a predetermined time period.

In operation 1860, the source device may adjust for phase of the detected output power signal since the detected output power signal may include the load modulation signal. The load modulation signal may have a different frequency or phase from the carrier wave, and the adjusting may be performed so that the phase of the load modulation signal may be adjusted to be the same as the phase of the carrier wave. The source device may adjust for the phase of the detected output power signal by mixing the detected output power signal with a signal that is in phase with the carrier wave, a signal that is out of phase with the carrier wave, and/or a signal of which a phase is shifted to a predetermined phase.

In operation 1870, the source device may demodulate the message from the target device, based on the mixed signal that is adjusted for a phase. For example, the source device may use a comparing unit. The comparing unit may compare the mixed signal and a reference signal so as to output a "High" value or a "Low" value. The reference signal may be the mixed signal when a magnitude of the mixed signal is small. The source device may demodulate the message based on the "High" value or the "Low" value.

Figure 19:
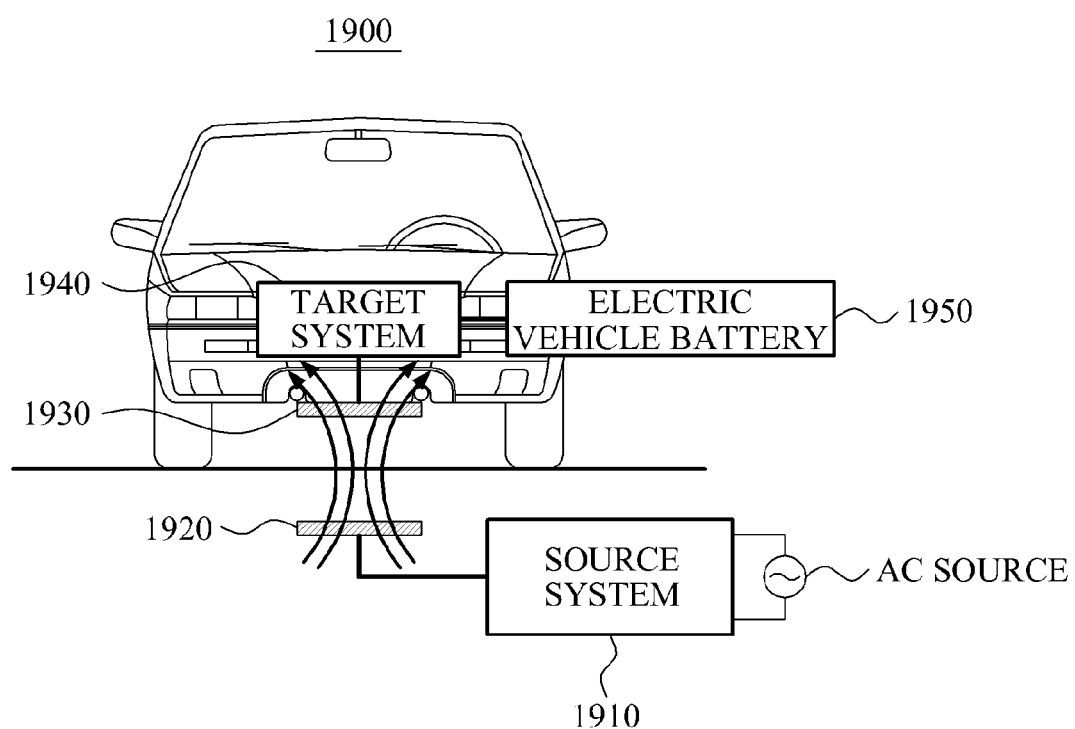
FIG. 19 illustrates and example of an electric vehicle charging system.

FIG. 19 illustrates an example of an electric vehicle charging system.

Referring to FIG. 19, an electric vehicle charging system 1900 includes a source system 1910, a source resonator 1920, a target resonator 1930, a target system 1940, and an electric vehicle battery 1950.

The electric vehicle charging system 1900 may have a similar structure to the wireless power transmission system of FIG. 1. The source system 1910 and the source resonator 1920 in the electric vehicle charging system 1900 may function as a source. Additionally, the target resonator 1930 and the target system 1940 in the electric vehicle charging system 1900 may function as a target.

The source system 1910 may include a AC/DC converter, a power detector, a power converter, a control/communication unit, similarly to the source device 110 of FIG. 1. The target system 1940 may include a Rectifying unit, a DC/DC converter, and a control/communication unit, similarly to the target device 120 of FIG. 1.

The electric vehicle battery 1950 may be charged by the target system 1940.

The electric vehicle charging system 1900 may use a resonant frequency in a band of a few kilohertz (KHz) to tens of MHz.

The source system 1910 may generate power, based on a type of charging vehicle, a capacity of a battery, and a charging state of a battery, and may supply the generated power to the target system 1940.

The source system 1910 may control the source resonator 1920 and the target resonator 1930 to be aligned. For example, when the source resonator 1920 and the target resonator 1930 are not aligned, the controller of the source system 1910 may transmit a message to the target system 1940, and may control alignment between the source resonator 1920 and the target resonator 1930.

For example, when the target resonator 1930 is not located in a position enabling maximum magnetic resonance, the source resonator 1920 and the target resonator 1930 may not be aligned. When a vehicle does not stop accurately, the source system 1910 may induce a position of the vehicle to be adjusted, and may control the source resonator 1920 and the target resonator 1930 to be aligned.

The source system 1910 and the target system 1940 may transmit or receive an ID of a vehicle, or may exchange various messages, through communication.

The descriptions of FIGS. 2 through 18 may be applied to the electric vehicle charging system 1900. However, the electric vehicle charging system 1900 may use a resonant frequency in a band of a few KHz to tens of MHz, and may transmit power that is equal to or higher than tens of watts to charge the electric vehicle battery 1950.

FIGS. 20A through 21B illustrate examples of applications in which a wireless power receiver and a wireless power transmitter may be mounted.

Figure 20A:
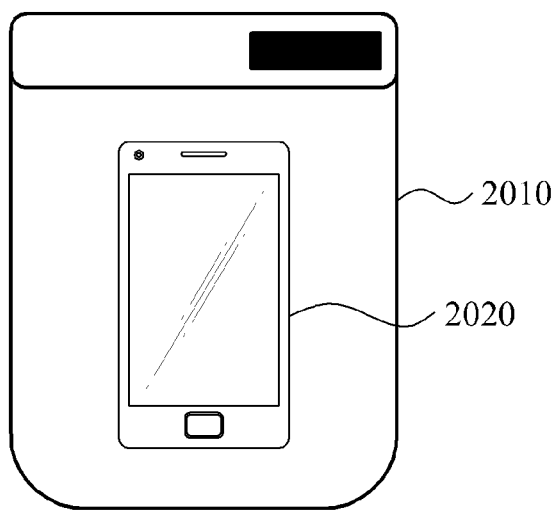
FIGS. 20A through 21B are diagrams illustrating examples of applications in which a wireless power receiver and a wireless power transmitter may be mounted.
Figure 20B:
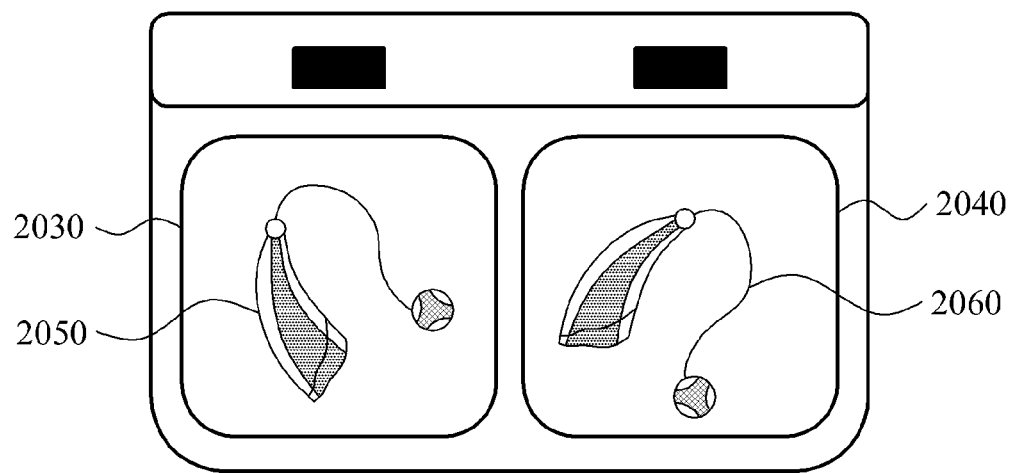

FIG. 20A illustrates an example of wireless power charging between a pad 2010 and a mobile terminal 2020, and FIG. 20B illustrates an example of wireless power charging between pads 2030 and 2040 and hearing aids 2050 and 2060.

In an example, a wireless power transmitter may be mounted in the pad 2010, and a wireless power receiver may be mounted in the mobile terminal 2020. The pad 2010 may be used to charge a single mobile terminal, namely the mobile terminal 2020.

In another example, two wireless power transmitters may be respectively mounted in the pads 2030 and 2040. The hearing aids 2050 and 2060 may be used for a left ear and a right ear, respectively. In this example, two wireless power receivers may be respectively mounted in the hearing aids 2050 and 2060.

Figure 21A:
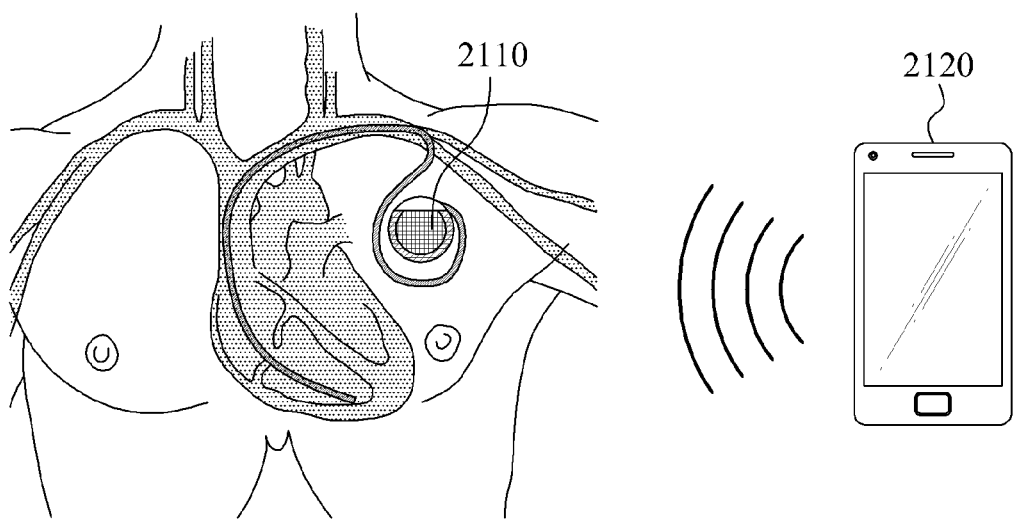
Figure 21B:
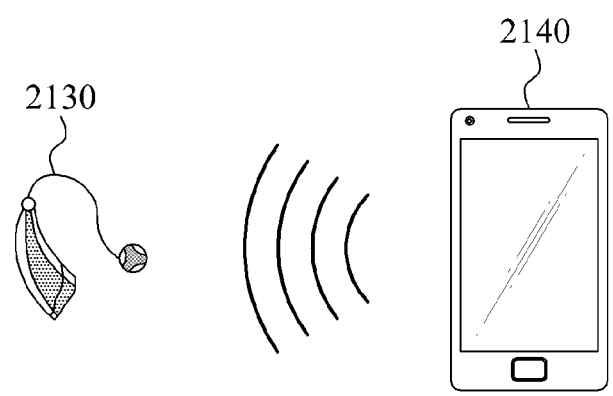

FIG. 21A illustrates an example of wireless power charging between an electronic device 2110 that is inserted into a human body, and a mobile terminal 2120. FIG. 21B illustrates an example of wireless power charging between a hearing aid 2130 and a mobile terminal 2140.

In an example, a wireless power transmitter and a wireless power receiver may be mounted in the mobile terminal 2120. In this example, another wireless power receiver may be mounted in the electronic device 2110. The electronic device 2110 may be charged by receiving power from the mobile terminal 2120.

In another example, a wireless power transmitter and a wireless power receiver may be mounted in the mobile terminal 2140. In this example, another wireless power receiver may be mounted in the hearing aid 2130. The hearing aid 2130 may be charged by receiving power from the mobile terminal 2140. Low-power electronic devices, for example Bluetooth earphones, may also be charged by receiving power from the mobile terminal 2140.

Figure 22:
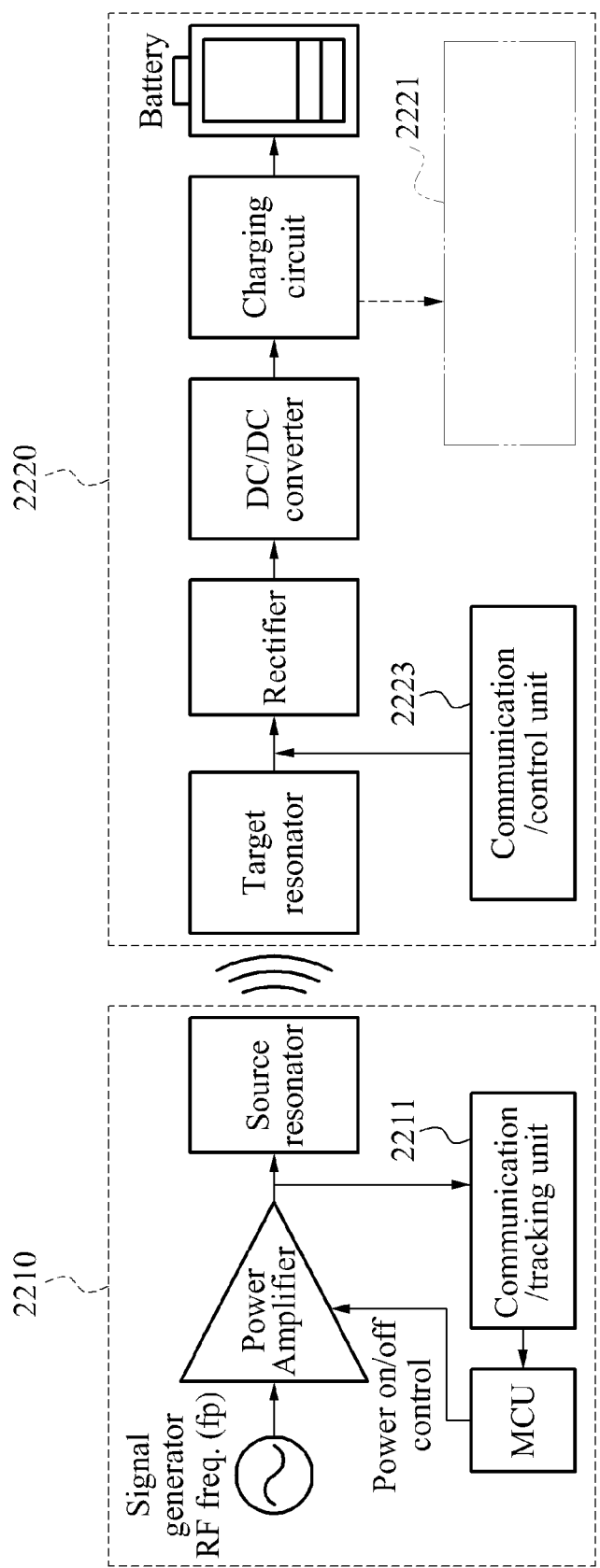
FIG. 22 is a diagram illustrating an example of a wireless power transmitter and a wireless power receiver.

FIG. 22 illustrates an example of a wireless power transmitter and a wireless power receiver.

In FIG. 22, a wireless power transmitter 2210 may be mounted in each of the pads 2030 and 2040 of FIG. 20B. Additionally, the wireless power transmitter 2210 may be mounted in the mobile terminal 2140 of FIG. 21B.

In addition, a wireless power receiver 2220 may be mounted in each of the hearing aids 2050 and 2060 of FIG. 20B.

The wireless power transmitter 2210 may have a similar configuration to the source device 110 of FIG. 1. For example, the wireless power transmitter 2210 may include a unit configured to transmit power using magnetic coupling.

As illustrated in FIG. 22, the wireless power transmitter 2210 includes a communication/tracking unit 2211. The communication/tracking unit 2211 may communicate with the wireless power receiver 2220, and may control an impedance and a resonant frequency to maintain a wireless power transmission efficiency. Additionally, the communication/tracking unit 2211 may perform similar functions to the power converter 114 and the control/communication unit 115 of FIG. 1.

The wireless power receiver 2220 may have a similar configuration to the target device 120 of FIG. 1. For example, the wireless power receiver 2220 may include a unit configured to wirelessly receive power and to charge a battery. As illustrated in FIG. 22, the wireless power receiver 2220 includes a target resonator, a rectifier, a DC/DC converter, and a charging circuit. Additionally, the wireless power receiver 2220 may include a control/communication unit 2223.

The communication/control unit 2223 may communicate with the wireless power transmitter 2210, and may perform an operation to protect overvoltage and overcurrent.

The wireless power receiver 2220 may include a hearing device circuit 2221. The hearing device circuit 2221 may be charged by the battery. The hearing device circuit 2221 may include a microphone, an analog-to-digital converter (ADC), a processor, a digital-to-analog converter (DAC), and a receiver. For example, the hearing device circuit 2221 may have the same configuration as a hearing aid.

The units described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums. The computer readable recording medium may include any data storage device that can store data which can be thereafter read by a computer system or processing device. Examples of the computer readable recording medium include read-only memory (ROM), random-access memory (RAM), CD-ROMs, magnetic tapes, floppy disks, optical data storage devices. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein.

A number of example embodiments have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A data communication apparatus using wireless power, the apparatus comprising:
a power signal detecting unit configured to detect a signal corresponding to a change in an impedance of a target device;
a demodulating unit configured to demodulate a message, which is modulated by the target device onto a carrier wave transmitted by the apparatus, using the detected signal, wherein the demodulating unit comprises
a phase mixing unit configured to generate a first mixed signal by mixing a first signal corresponding to the detected signal and a signal that is in chase with the carrier wave, and
a comparing unit configured to co are the first mixed signal and a reference signal; and
a source resonator configured to transmit the carrier wave wirelessly to the target device,
wherein the demodulating unit mixes the detected signal and the signal that is in phase with the carrier wave.

2. The apparatus of claim 1, further comprising a controller configured to control the phase of the carrier wave based on the size of the source resonator.

3. The apparatus of claim 1, further comprising a sensing unit configured to sense the change in the impedance of the target device based on a change in the magnitude of the detected signal.

4. The apparatus of claim 1, wherein the power signal detecting unit comprises a coupling unit configured to detect the signal using a coupling resistor, a coupling inductor, or a coupling capacitor.

5. The apparatus of claim 4, wherein the coupling unit performs coupling to detect a signal from a power line or a ground line that is connected between a power amplifier and the source resonator.

6. The apparatus of claim 4, wherein the carrier wave uses a resonance frequency of the source resonator as a carrier frequency.

7. The apparatus of claim 6, wherein the power signal detecting unit comprises a power limiting unit configured to limit the magnitude of the detected signal.

8. The apparatus of claim 7, wherein the power limiting unit limits the magnitude of the detected signal by a difference between a maximum value of the carrier wave and a maximum value of the output power signal generated based on the change in the impedance of the target device.

9. The apparatus of claim 1, wherein the power signal detecting unit comprises a reception controller configured to control reception of the signal while the source resonator transmits a wake-up signal that awakens the target device.

10. The apparatus of claim 1, wherein the demodulating unit demodulates the message from the target device based on a value output from the comparing unit.

11. The apparatus of claim 1, wherein the demodulating unit comprises:
   a distributing unit configured to divide the detected signal into the first signal and a second signal;
   an in-phase mixing unit configured to generate the first mixed signal by mixing the first signal and the signal that is in phase with the carrier wave; and
   an out-of-phase mixing unit configured to generate a second mixed signal by mixing the second signal and a signal that is out of phase with the carrier wave.

12. The apparatus of claim 11, wherein the demodulating unit further comprises a comparing unit configured to compare the first mixed signal and the second mixed signal.

13. The apparatus of claim 11, wherein the demodulating unit further comprises:
   a first comparing unit configured to compare the first mixed signal and a first reference signal; and
   a second comparing unit configured to compare the second mixed signal and a second reference signal.

14. The apparatus of claim 13, wherein the demodulating unit demodulates the message from the target device by comparing the value output from the first comparing unit or the value output from the second comparing unit, for one or more time periods.

15. The apparatus of claim 1, wherein the demodulating unit generates a second mixed signal by mixing a second signal corresponding to the detected signal and a signal corresponding to the carrier wave of which a phase is shifted.

16. A data communication apparatus using wireless power, the apparatus comprising:
   a target resonance unit configured to wirelessly receive a carrier wave from a source device;
   a modulating unit configured to modulate a message onto the received carrier wave based upon an impedance mismatching between the source device and a target device of the data communication apparatus; and
   a controller configured to control the impedance mismatching by changing the impedance of the target device,
   wherein the modulating unit modulates the message to be demodulated at the source device based on mixing of a signal corresponding to a change in an impedance of the target device and a signal that is in phase with the carrier wave, and
   wherein the demodulating of the message comprises generating a first mixed signal by mixing a first signal corresponding to the detected signal and the signal that is in phase with the carrier wave,
   comparing the first mixed signal and a reference signal, and outputting a value based on the comparison.

17. The apparatus of claim 16, wherein the controller changes the impedance and a phase of the target device.

18. The apparatus of claim 17, wherein the controller controls current flowing through a load.

19. The apparatus of claim 17, wherein the controller changes the impedance and the phase of the target device by switching a switch connected to a load of the target device.

20. A data communication method executed by a source device using wireless power, the method comprising:
   transmitting a carrier wave wirelessly to a target device;
   detecting a signal corresponding to a change in an impedance of the target device; and
   demodulating a message, which is modulated by the target device onto the carrier wave transmitted by the source device, using the detected signal,
   wherein the demodulating comprises generating a first mixed signal by mixing a first signal corresponding to the detected signal and a signal that is in phase with the carrier wave,
   comparing the first mixed signal and a reference signal, and outputting a value based on the comparison, and
   wherein the demodulating comprises mixing the detected signal and the signal that is in phase with the carrier wave.

21. The method of claim 20, further comprising controlling the phase of the carrier wave based on the size of a source resonator.

22. The method of claim 20, wherein the detecting comprises performing coupling to detect the signal using a coupling resistor, a coupling inductor, or a coupling capacitor.

23. The method of claim 20, wherein the detecting comprises limiting the magnitude of the detected signal.

24. The method of claim 23, wherein the magnitude of the detected signal is limited by the difference between the maximum value of the carrier wave and the maximum value of the detected signal generated based on the change in the impedance of the target device.

25. The method of claim 20, wherein the demodulating comprises demodulating a message of the target device based on the outputted value.

26. A data communication method executed by a target device using wireless power, the method comprising:
   receiving a carrier wave wirelessly from a source device;
   modulating a message onto the received carrier wave based upon an impedance mismatching between the source device and the target device; and
   controlling the impedance mismatching by changing an impedance of the target device,
   wherein the modulating comprises modulating the message to be demodulated at the source device based on mixing of a signal corresponding to a change in an impedance of the target device and a signal that is in phase with the carrier wave, and
   wherein the demodulating of the message comprises generating a first mixed signal by mixing a first signal corresponding to the detected signal and the signal that is in phase with the carrier wave,
   comparing the first mixed signal and a reference signal, and outputting a value based on the comparison.

27. The method of claim 26, wherein the controlling comprises controlling current flowing through a load of the target device.

* * * * *